US010031911B2

(12) United States Patent
Sharma et al.

(10) Patent No.: US 10,031,911 B2
(45) Date of Patent: *Jul. 24, 2018

(54) MOBILE DEVICE TO CONTROL VIRTUAL ASSISTANT SYSTEM

(71) Applicant: Wand Labs, Inc., Redmond, WA (US)

(72) Inventors: Vishal Sharma, Los Altos, CA (US); Elhum Amjadi, Foster City, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,722

(22) Filed: Oct. 6, 2016

(65) Prior Publication Data

US 2017/0024378 A1     Jan. 26, 2017

Related U.S. Application Data

(63) Continuation of application No. 14/738,104, filed on Jun. 12, 2015, now Pat. No. 9,489,616, which is a
(Continued)

(51) Int. Cl.
*H04W 4/80* (2018.01)
*G06F 17/28* (2006.01)
(Continued)

(52) U.S. Cl.
CPC ............ *G06F 17/289* (2013.01); *G06F 3/017* (2013.01); *G06F 3/0482* (2013.01);
(Continued)

(58) Field of Classification Search
CPC ...... G06F 17/289; G06F 3/017; G06F 3/0432; G06F 3/0482; G06F 17/2785; H04W 4/80; H04W 4/008; H04W 4/20; H04W 12/08; H04L 63/06; H04L 67/22; G06Q 10/02; G06Q 30/0601; G06Q 50/01; G10L 15/22; G10L 2015/223; G06N 3/006

See application file for complete search history.

(56) References Cited

U.S. PATENT DOCUMENTS 7,155,672 B1    12/2006 Adler et al.
8,495,678 B2     7/2013 Perlman et al.
(Continued)

OTHER PUBLICATIONS

Nguyen et al., NBHA—a distributed network-based humanoid software architecture, 2006, IEEE, p. 456-461.*
(Continued)

*Primary Examiner* — McDieunel Marc
(74) *Attorney, Agent, or Firm* — Law Offices of Richard Chi; Richard Chi

(57) ABSTRACT

A method of controlling an external service among a plurality of external services, by receiving an input command at a mobile device, translating the input command into a common language sharable between the external services so that such input commands are understood between the plurality of devices and services and functions are performed at the devices and or services in response to the input command. This control of the services is also sharable as instructed by an input command.

19 Claims, 17 Drawing Sheets

Related U.S. Application Data continuation of application No. 14/608,786, filed on Jan. 29, 2015, now Pat. No. 9,111,214.

(60) Provisional application No. 61/933,405, filed on Jan. 30, 2014.

(51) Int. Cl.

| | | |
|---|---|---|
| *G06N 3/00* | (2006.01) | |
| *H04L 29/06* | (2006.01) | |
| *H04W 4/00* | (2018.01) | |
| *H04W 4/20* | (2018.01) | |
| *G06F 3/01* | (2006.01) | |
| *G06F 3/0482* | (2013.01) | |
| *G06F 17/27* | (2006.01) | |
| *H04L 29/08* | (2006.01) | |
| *H04W 12/08* | (2009.01) | |
| *G06Q 10/02* | (2012.01) | |
| *G06Q 30/06* | (2012.01) | |
| *G06Q 50/00* | (2012.01) | |
| *G06Q 50/12* | (2012.01) | |
| *G10L 15/22* | (2006.01) | |

(52) U.S. Cl.
CPC ......... *G06F 17/2785* (2013.01); *G06N 3/006* (2013.01); *G06Q 10/02* (2013.01); *G06Q 30/0601* (2013.01); *G06Q 50/01* (2013.01); *G06Q 50/12* (2013.01); *G10L 15/22* (2013.01); *H04L 63/06* (2013.01); *H04L 63/08* (2013.01); *H04L 63/101* (2013.01); *H04L 67/22* (2013.01); *H04L 67/327* (2013.01); *H04L 67/42* (2013.01); *H04W 4/008* (2013.01); *H04W 4/20* (2013.01); *H04W 4/80* (2018.02); *H04W 12/08* (2013.01); *G10L 2015/223* (2013.01)

(56) References Cited

U.S. PATENT DOCUMENTS

| | | | |
|---|---|---|---|
| 8,661,496 | B2 | 2/2014 | Perlman et al. |
| 8,700,006 | B2 | 4/2014 | Ni |
| 8,893,207 | B2 | 11/2014 | Perlman et al. |
| 9,108,107 | B2 | 8/2015 | Perlman et al. |
| 9,459,894 | B2* | 10/2016 | Bobroff ............... G06F 9/45529 |
| 2004/0030640 | A1 | 2/2004 | Mahnken et al. |
| 2013/0321431 | A1 | 12/2013 | Chen et al. |
| 2013/0321441 | A1 | 12/2013 | Pahwa et al. |
| 2013/0321442 | A1 | 12/2013 | Van Os et al. |
| 2013/0321443 | A1 | 12/2013 | Pahwa et al. |
| 2013/0321450 | A1 | 12/2013 | Hultquist et al. |
| 2013/0321456 | A1 | 12/2013 | Hultquist et al. |
| 2013/0321472 | A1 | 12/2013 | Piemonte et al. |
| 2013/0324154 | A1 | 12/2013 | Raghupathy et al. |
| 2014/0028799 | A1 | 1/2014 | Kuffner et al. |
| 2014/0153489 | A1 | 6/2014 | Perras et al. |
| 2014/0162693 | A1 | 6/2014 | Wachter et al. |
| 2014/0214398 | A1 | 7/2014 | Sanders et al. |
| 2014/0341109 | A1 | 11/2014 | Cartmell et al. |
| 2015/0094046 | A1* | 4/2015 | Jung ................ H04W 36/0022 455/415 |

OTHER PUBLICATIONS

Karsai et al., Component Generation Technology for Semantic Tool Integration, 2000, IEEE, p. 491-499.*

"Non Final Office Action Issued in U.S. Appl. No. 14/608,786", dated Mar. 17, 2015, 22 Pages.

"Notice of Allowance Issued in U.S. Appl. No. 14/608,786", dated Apr. 30, 2015, 9 Pages.

"Non-Final Office Action Issued in U.S. Appl. No. 14/738,104", dated Apr. 14, 2016, 21 Pages.

"Notice of Allowance Issued in U.S. Appl. No. 14/738,104", dated Jul. 13, 2016, 9 Pages.

"Non-Final Office Action Issued in U.S. Appl. No. 14/738,121", dated May 2, 2016, 8 Pages.

"Notice of Allowance Issued in U.S. Appl. No. 14/738,121", dated Jul. 13, 2016, 7 Pages.

"Notice of Allowance Issued in U.S. Appl. No. 14/738,121", dated Nov. 28, 2016, 7 Pages.

"Non Final Office Action Issued in U.S. Appl. No. 15/158,718", dated Dec. 9, 2016, 8 Pages.

* cited by examiner

160

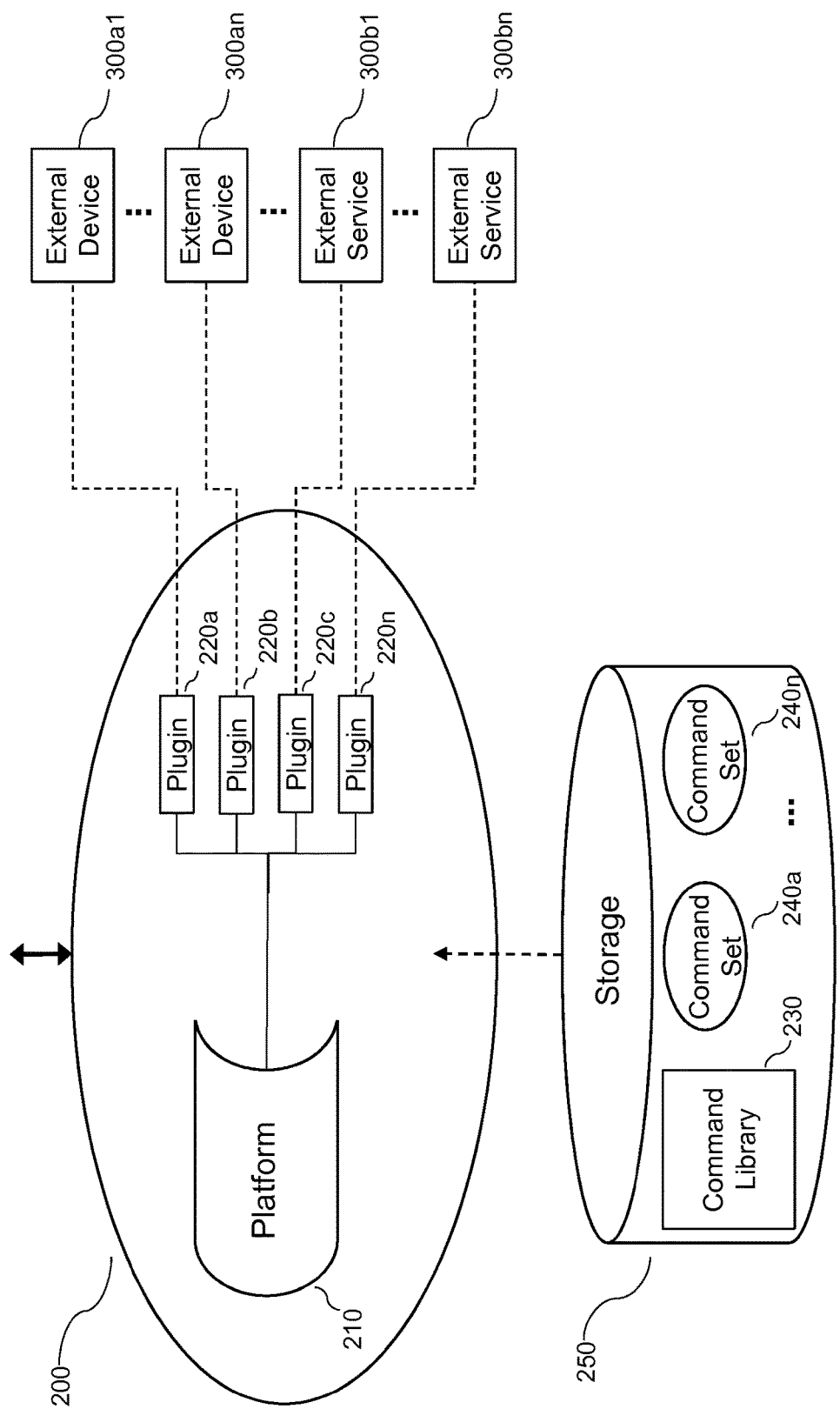

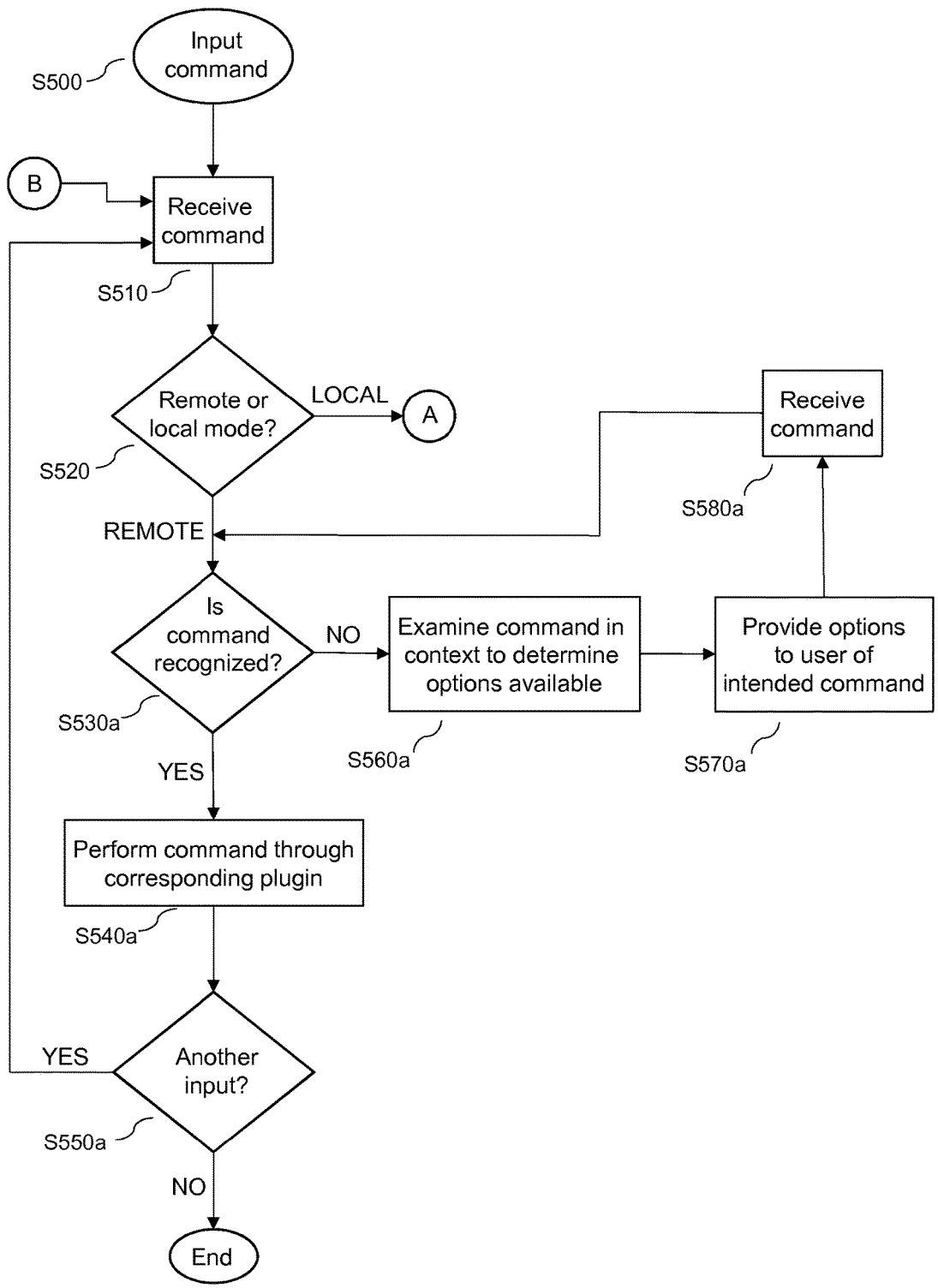

MOBILE DEVICE TO CONTROL VIRTUAL ASSISTANT SYSTEM

CROSS-REFERENCE TO RELATED APPLICATIONS

This application claims priority under 35 U.S.C. § 120 from U.S. patent application Ser. No. 14/608,786, filed on Jan. 29, 2015, which claims priority to Provisional Application No. 61/933,405, filed on Jan. 30, 2014, in the United States Patent and Trademark Office, the disclosures of which are incorporated herein in their entirety by reference.

BACKGROUND OF THE INVENTIVE CONCEPT

1. Field of the Invention

The present general inventive concept relates to a virtual assistant system to wirelessly control a plurality of external devices and services and to provide communication and sharing of information between the plurality of external devices and services, and to selectively allow sharing of the control with other users.

2. Description of the Related Art

Advancements in wireless communications have allowed innovation in data sharing to grow at a rapid rate. A user may use a mobile device (such as a phone, tablet computer, wristwatch, etc.) to open up various applications/programs, operate various devices, and communicate with other mobile devices. A development called the Internet of Things, or IoT, reflects a growing trend of connecting to and controlling various devices and services wirelessly.

However, the mobile device is limited to requiring the user to input commands, instructions, and data in a manner unique to each specific application/program and external devices. More specifically, programs such as Facebook™ and LinkedIn™ each communicate in their own proprietary languages. If a user wishes to look up a person's profile in LinkedIn™ after having found that person in Facebook™, the user is required to type in proper search criteria in proper fields within the LinkedIn™ program itself. As such, although a user may separately communicate with Facebook™ and LinkedIn™, these programs do not and cannot communicate with each other.

As another example, Phillips has developed a light emitting diode (LED) light bulb (i.e., the Phillips "Hue") that allows a user to change colors emitting therefrom via a mobile device that is running an application associated with the bulb. More specifically, the user must download and install, onto the mobile device, the application associated with the bulb, which communicates with the bulb using the Phillips Hue proprietary language. After the application is installed and running on the mobile device, the user may then control the tone, contrast, and color of the bulb using the mobile device. However, the user cannot grant access to the light bulb to another user operating another mobile device. Instead, if the other user wishes to control the light bulb with the other mobile device, the other user must also download and install the application associated with the bulb into the other mobile device.

Moreover, the user cannot use information within the application associated with the light bulb to interact with another application. For example, the user may not use information within the light bulb application to purchase more light bulbs in another application such as Amazon™. As such, the application associated with the bulb is limited merely to allowing a user to control the particular light bulb associated with the application stored within the user's mobile device.

Further, Apple™ and Google™ each include a voice assistant (Siri for Apple and Google Now for Google) on its respective mobile device that translates a voice received into a search program. However, the Siri™ and Google Now™ assistants are limited to providing a search and some device actions, and have a limited integration with other applications such as OpenTable™, etc.

Accordingly, there is a need for a system that allows all devices, programs, services and applications connected with the system to communicate therebetween.

Further, there is a need to be able to control any external devices or services desired via the web by inputting commands to perform such controls from a hand-held device.

SUMMARY OF THE INVENTIVE CONCEPT

The present general inventive concept provides a mobile device, assistant server, and virtual assistant system configured to allow communication between a plurality of devices and services, and control thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a virtual assistant system, comprising: a mobile device to receive an input command corresponding to a function to be performed at an external device or service, to translate the input command into a semantic information interchange format language, and to transmit the translated input command; at least one external device or service to perform the corresponding function; and an assistant server to receive the translated input command from the mobile device, the assistant server including a plugin corresponding to each of the at least one external device or service, the plugins being configured to convert the received input command into a command recognizable by the corresponding at least one device or service to perform the associated function.

In an exemplary embodiment, the assistant server can analyze context information of the input command before converting the input command to accurately determine the intended function to be performed by the input command.

In an exemplary embodiment, the context information analyzed by the assistant server may include at least one of a location of the mobile device when command was input, a time of day when the command was input, co-presence of specific individuals, involuntary actions by a user, and action sequences taken by a user of the mobile device.

In an exemplary embodiment, the action sequences taken by the user may include a plurality of input commands made simultaneously or sequentially.

In an exemplary embodiment, the action sequences taken by the user may include an input command that is invalidated and followed by another input command.

In an exemplary embodiment, when the assistant server determines that there exists more than one possible intended function to be performed at a device or service by the input command, the assistant server can clarify which function is intended to be performed by forwarding the possible intended options back to the mobile device to select the intended command and then can gather additional context information associated with the selection at the mobile device.

In an exemplary embodiment, when a first form of an input command is not recognized at the assistant server and then a follow-up second form of the input command is input, the assistant server can create and store a new command in the first form of the input which is recognizable to perform the intended function at the external device or service.

In an exemplary embodiment, when the assistant server recognizes a repeated cluster of input commands, the assistant server can create a new consolidated input command to represent performing the cluster of input commands simultaneously.

In an exemplary embodiment, the repeated cluster of input commands and the new consolidated input command can be gesture-type input commands.

In an exemplary embodiment, the context information analyzed by the assistant server can include data to identify at least one specific user of the mobile device and the assistant server can convert the received input command according to the at least one specific identified user.

In an exemplary embodiment, the assistant server can store credentials corresponding to a user of the mobile device, where the credentials can include data to authorize the user to control the at least one external device or service through the input commands.

In an exemplary embodiment, an input command at the mobile device authorizes at least one other user of another respective mobile device to control the at least one external device or service through input commands.

In an exemplary embodiment, another input command at the mobile device can revoke the authorization of the at least one other user to control the at least one external device or service.

In an exemplary embodiment, wherein revocation of authorization of the at least one other user may include: displaying a history of users provided with the authorization; and selecting among the history of users in which access is to be revoked.

In an exemplary embodiment, the input command to authorize the at least one other user to control the at least one external device or service includes information to limit the authorization to at least one of a level of control, a location in which control is permitted, a time frame in which the control is permitted and an access path in which the other user approaches the external device or service.

In an exemplary embodiment, the location in which control is permitted to at least one other user can be a security protected building or room.

In an exemplary embodiment, the path in which control is permitted to at least one other user can be a predetermined secured entryway among plural secured entryways into a security protected building or room.

In an exemplary embodiment, the authorization of the at least one other user cab be provided through the stored credentials of the authorizing user so that the authorization and revocation of authorization remains under the control of the user with the stored credentials.

In an exemplary embodiment, the authorized other user cannot enter other credentials and is blocked from obtaining access to the authorizing user's credentials.

In an exemplary embodiment, the assistant server: can determine context information regarding providing authorization to by the mobile device; and can automatically authorize at least one other user of another mobile device to control the at least one external device or service through input commands, according to the stored credentials, the authorization being based on the received context information.

In an exemplary embodiment, the received context information can identify at least one specific user of the other mobile device.

In an exemplary embodiment, the received context information can include data regarding a historic time range in which the user of the mobile device has authorized other users to control the at least one external device or service.

In an exemplary embodiment, the assistant server connects to a plurality of external devices or services corresponding to the credentials of the user.

In an exemplary embodiment, the assistant server connects to the plurality of external devices or services by presenting the credentials to the respective external devices or services and determining if further authentication is necessary to input commands to the plurality of external devices or services.

The foregoing and/or other features and utilities of the present general inventive concept may also be achieved by providing a mobile device, comprising: a sensor to receive an input command to perform a function at an external service among a plurality of external services; and an assistant interface to translate the received input command into a semantic information interchange language format to be stored in a library of other semantic information interchange format language commands within an external server and to be shared between the plurality of external services through the external server, and to send the translated input command to the external server to perform the input command at the external service or to receive the converted command back together with proprietary language of the external service to directly communicate with and perform the function at the external service.

In an exemplary embodiment, a determination as to whether the external server or the mobile device performs the function at the external service can be based on at least one of a location of the mobile device with respect to the external service and a network communication established between the mobile device and the external service, and the external server can be connected with the plurality of external services by at least one of an internet connection with the external services and a local network connection with the external services.

In an exemplary embodiment, specific credentials can be required to be input at the sensor in order to perform functions at respective ones of each of the plurality of external services.

In an exemplary embodiment, authorization for other mobile devices to perform functions at respective ones of each of the plurality of external services can be performed by inputting an authorization command at the sensor.

In an exemplary embodiment, revocation of authorization of other mobile devices to perform functions at respective ones of each of the plurality of external services can be performed by inputting a revocation of authorization command at the sensor.

In an exemplary embodiment, authorization input command and revocation of authorization input command can be performed by providing gestures at the sensor.

In an exemplary embodiment, the authorization input command for other mobile devices to perform functions at respective ones of each of the plurality of external services can include information to limit the authorization to at least one of a level of control, a location in which control is permitted, a time frame in which the control is permitted and an access path in which the other user approaches the external device or service.

The foregoing and/or other features and utilities of the present general inventive concept may also be achieved by providing an assistant server, comprising: a storage system to store commands to perform functions at an external device or service, the commands provided in a semantic information interchange language format that can be shared between a plurality of external devices and services; a plugin corresponding to each respective one of the plurality of external devices and services, each plugin being configured to translate between the semantic information interchange language and a respective proprietary language of the corresponding device or service; and a platform configured to share a library of semantic information interchange language format commands between the plurality of external devices and services and a mobile device in which commands to perform a function are received.

In an exemplary embodiment, the storage system can store at least one command set corresponding to a respective one of the plurality of external devices and services, each command set including semantic information interchange language format commands to perform functions at the respective external device or service.

In an exemplary embodiment, each plugin can be created at the assistant server to include a set of commands selected from the stored library of commands, the set of commands to correspond with associated functions to be performed at the corresponding device or service.

In an exemplary embodiment, the platform can be configured to wirelessly connect to a plurality of mobile devices to share information therebetween, the information being shared is provided in the semantic information interchange language format to be translated at the mobile device In an exemplary embodiment, the platform can determine whether the function to be performed at the external device or service will be controlled by the mobile device or the assistant server, the determination being based on at least one of a location of the mobile device with respect to the external device or service and a network communication established between the mobile device and the external device or service.

In an exemplary embodiment, when the platform determines that the function to be performed at the external device or service will be controlled from the assistant server, the platform can perform the function through the corresponding plugin.

In an exemplary embodiment, when the platform determines that the function to be performed at the external device or service will be controlled by the mobile device, the platform can share the corresponding proprietary language with the mobile device.

In an exemplary embodiment, the platform can be connected with the plurality of external devices and services and the mobile device by an internet connection therebetween, while the mobile device can be connected with the plurality of external devices and services by a local network connection.

In an exemplary embodiment, the platform can analyze context information of a semantic information interchange language format command received from the mobile device before the plugin corresponding to the respective one of the plurality of external devices and services converts the received command into the proprietary language so that the intended function to be performed by the received command is determined accurately.

In an exemplary embodiment, the context information analyzed by the platform can include at least one of a location of the mobile device when the semantic information interchange language format command was received, a time of day when the semantic information interchange language format command was received, co-presence of specific individuals, involuntary actions by the user, and action sequences taken by a user of the mobile device.

In an exemplary embodiment, the action sequences taken by the user can include a plurality of commands received simultaneously or sequentially by the mobile device.

In an exemplary embodiment, the action sequences taken by the user can include an input command that is invalidated and followed by another input command.

In an exemplary embodiment, when the platform determines that there exists more than one possible intended function to be performed at a device or service by a received semantic information interchange language format command, the platform can clarify which function is intended to be performed by forwarding the possible intended options back to the mobile device to select one among the possible intended options.

In an exemplary embodiment, the platform can collect additional context information associated with the selection among the possible intended option at the mobile device to create another command and update the library of commands with the newly created command.

In an exemplary embodiment, when a first form of a received semantic information interchange format command is not recognized at the platform and then a follow-up second form of the semantic information interchange format command is received, the platform can create and store a new command in the first form of the received semantic information interchange format command which is recognizable to perform the intended function at the external device or service.

In an exemplary embodiment, when the platform recognizes a repeated cluster of received semantic information interchange format commands, the platform can create a new consolidated semantic information interchange format command to represent performing the cluster of received semantic information interchange format commands simultaneously.

In an exemplary embodiment, the repeated cluster of received semantic information interchange format commands and the new consolidated semantic information interchange format command can be gesture-type commands.

In an exemplary embodiment, the context information analyzed by the platform can include data to identify at least one specific user of the mobile device and the platform can control the plugin to convert the received semantic information interchange format command according to the at least one specific identified user.

In an exemplary embodiment, the platform can predict at least one of the commands to perform a function at the plurality of devices and services according to the context information, and the platform can automatically perform the function according to the predicted command without having to first receive the input command from the mobile device.

In an exemplary embodiment, the storage may store credentials corresponding to a user of the mobile device, the credentials including data to authorize the user to control the at least one external device or service through the input commands.

In an exemplary embodiment, the platform may authorize at least one other user of another respective mobile device to control the at least one external device or service through a received input command.

In an exemplary embodiment, the received input command may be provided by the mobile device.

In an exemplary embodiment, the received input command may be provided by an external sensor device capable of translating an input command into the semantic information interchange format language.

In an exemplary embodiment, the platform may further authorize the at least one other user to input commands to authorize yet at least one additional user to control the at least one external device or service through input commands once the at least one other user is permitted authorization.

In an exemplary embodiment, the platform may authorize the at least one other user to control the at least one external device or service when the at least one other user is determined to be within a specific geo-fenced area, the determination being made by receiving an input from a sensor that can detect the at least one other user and provide the sensed result in the semantic information interchange language format.

In an exemplary embodiment, the platform may authorize the at least one other user by using the stored credentials of the authorizing user so that the authorization and revocation of authorization remains solely under the control of the authorizing user with the stored credentials.

In an exemplary embodiment, the authorized other user can be blocked from entering any and from obtaining access to the stored authorizing user's credentials.

In an exemplary embodiment, the platform may determine context information regarding providing authorization by the mobile device, and the platform can automatically authorize at least one other user of another mobile device to control the at least one external device or service through input commands according to the stored credentials, the authorization being based on the received context information.

In an exemplary embodiment, the received context information may identify at least one specific user of the other mobile device.

In an exemplary embodiment, the received context information may further identify which of the plurality of devices and services the platform has previously authorized the at least one specific user to control.

In an exemplary embodiment, the received context information may include data regarding a historic time range in which the user of the mobile device has authorized other users to control the at least one external device or service.

In an exemplary embodiment, the platform may connect to a plurality of external devices or services corresponding to the stored credentials of the user.

In an exemplary embodiment, the platform may connect to the plurality of external devices or services by presenting the stored credentials to the respective external devices or services through the respective plugin and determining whether further authentication is necessary to input commands to the plurality of external devices or services.

The foregoing and/or other features and utilities of the present general inventive concept may also be achieved by providing a virtual assistant system, comprising: a mobile device to transmit an input command corresponding to a function to be performed at a predetermined external device or service, the input command to first be translated into a semantic information interchange format language that can be communicated with and between a plurality of external devices and services wirelessly connected within the virtual assistant system before being transmitted; and an assistant server to receive the transmitted input command from the mobile device and to determine whether the function to be performed at the predetermined external device or service will be controlled by the mobile device or the assistant server, the determination being based on at least one of a location of the mobile device with respect to the predetermined external device or service and a network communication established between the mobile device and the external device or service, the assistant server including a plugin for each external device or service wirelessly connected to the virtual assistant system, each plugin being configured to attach proprietary language of the corresponding external device or service to the received input command required to perform the associated function at either the mobile device or the assistant server according to the control determination.

In an exemplary embodiment, each plugin can attach the proprietary language of the corresponding external device or service to the received input command by embedding the proprietary language therein to enable communication with the external device or service to be controlled by the assistant server or to be transmitted back to the mobile device to enable the mobile device to directly control the external device or service.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 4 is a block diagram illustrating an exemplary embodiment of an assistant server usable with virtual assistant systems illustrated in FIGS. 1A-1B;

FIGS. 5A and 5B are flowcharts illustrating command processes of the virtual assistant system, according to exemplary embodiments of the present general inventive concept;

DETAILED DESCRIPTION OF THE PREFERRED EMBODIMENTS

Figure 1A:
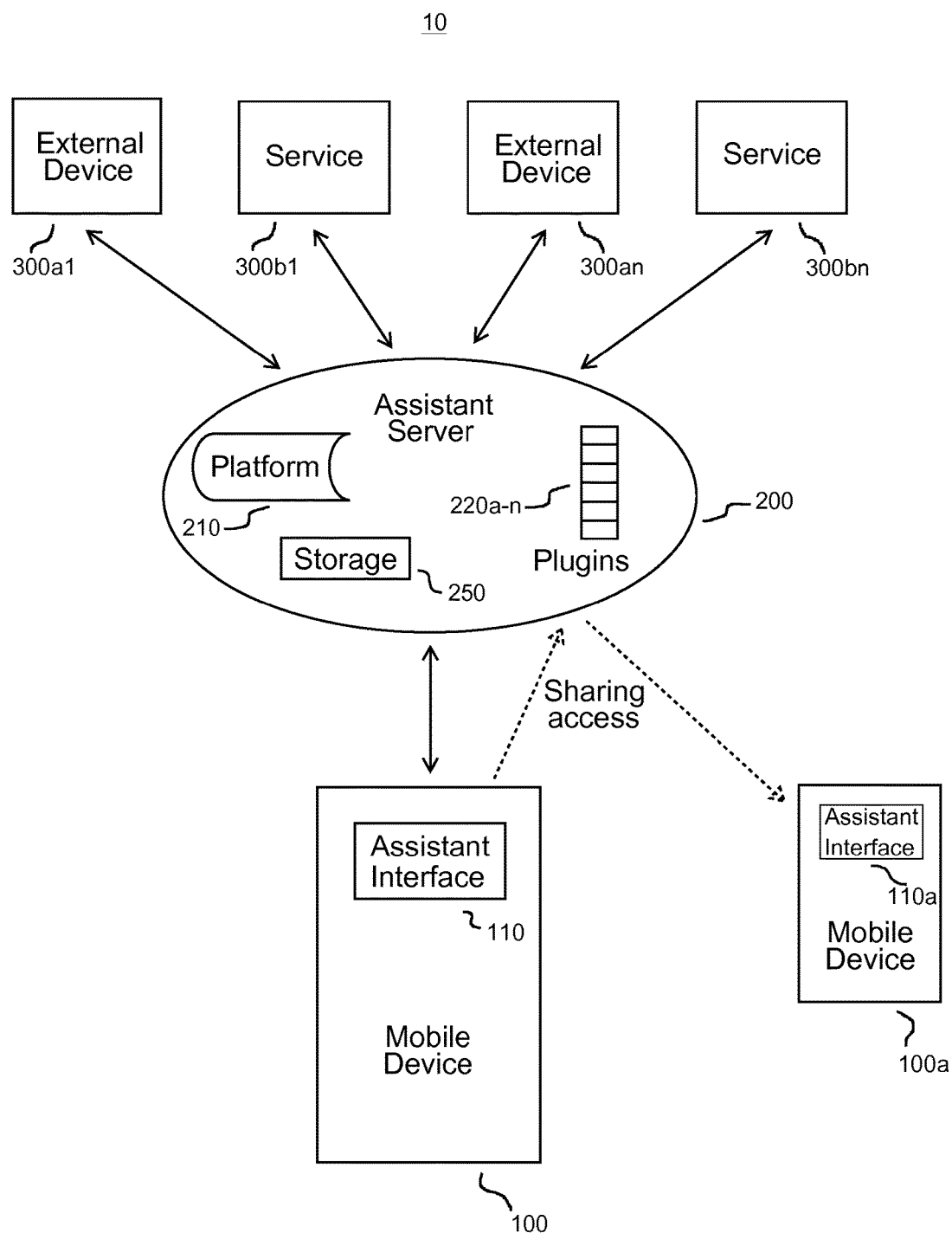
FIG. 1A is a block diagram illustrating a virtual assistant system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit to process at least one function or operation, wherein the unit and the block may be embodied as hardware or software or embodied by combining hardware and software.

Hereinafter, one or more exemplary embodiments of the present general inventive concept will be described in detail with reference to accompanying drawings.

Figure 1B:
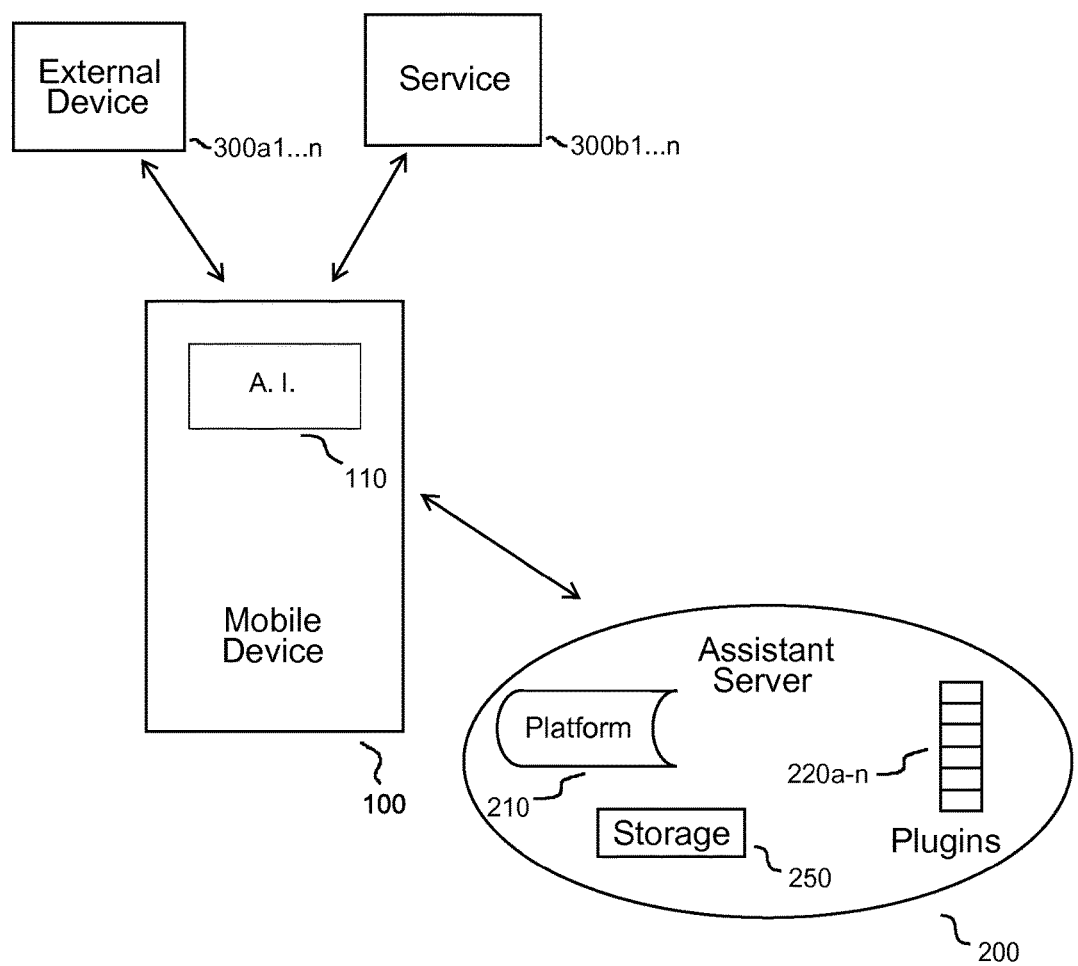
FIG. 1B is a block diagram illustrating a virtual assistant system according to another exemplary embodiment of the present general inventive concept.

FIG. 1A illustrates a virtual assistant system 10 according to an exemplary embodiment of the present general inventive concept, and FIG. 1B illustrates a virtual assistant system 10 according to another exemplary embodiment of the present general inventive concept.

The virtual assistant system 10 according to the exemplary embodiments of FIGS. 1A and 1B may include a mobile electronic device 100, an assistant server 200, and an external device 300a (or devices 300a1-n) and/or service 300b (or services 300b1-n).

The mobile electronic device 100 (hereinafter "mobile device") includes capabilities of wireless or wired connectivity with the Internet and various networks in which the mobile device 100 can be configured to communicate. More specifically, the mobile device 100 may communicate with the assistant server 200 and/or the external device(s) 300a and service(s) 300b) using Wi-Fi, Wi-Fi direct, Near-field communication, Bluetooth, radio frequency identification (RFID), Ethernet, FireWire, universal serial bus (USB), high definition multimedia interface (HDMI), or any other type of wireless or wired connection, but is not limited thereto. The communications between the mobile device 100, the assistant server 200, and the external device(s) 300a1-n and service(s) 300b1-n may be performed via the Internet, including cloud computing applications, satellite, a local network, etc.

The mobile device 100 may be any type of computing platform, including a smartphone, a tablet computer, a laptop computer, a smart watch, or a wearable device, but is not limited thereto, and may even include non-mobile devices such as a desktop computer or other stationary computing devices. The mobile device 100 is described in greater detail below with respect to FIG. 2A.

The mobile device 100 may also include an assistant interface 110 (also referred to as "the Client") which is specifically created as part of the virtual assistant system 10 to allow all actions, commands, etc., originating at the mobile device 100, or obtained by the mobile device 100 via another sensor-type device, to be communicated to the assistant server 200, and vice versa, to allow the assistant server 200 to communicate necessary information to the mobile device 100 in which the assistant interface 110 is provided. The assistant interface 110 also allows communications with other assistant interfaces 110a-n provided on another user's mobile device 100a-n, or other servers which may contain libraries of commands, to be described in more detail infra. The assistant interface 110 provided at the mobile device 100 can perform similar operations as a "plugin" or "connector," among other operations to be described herein. The assistant interface 110 is described in greater detail below with respect to FIGS. 2A, and 5A-5B.

Figure 2A:
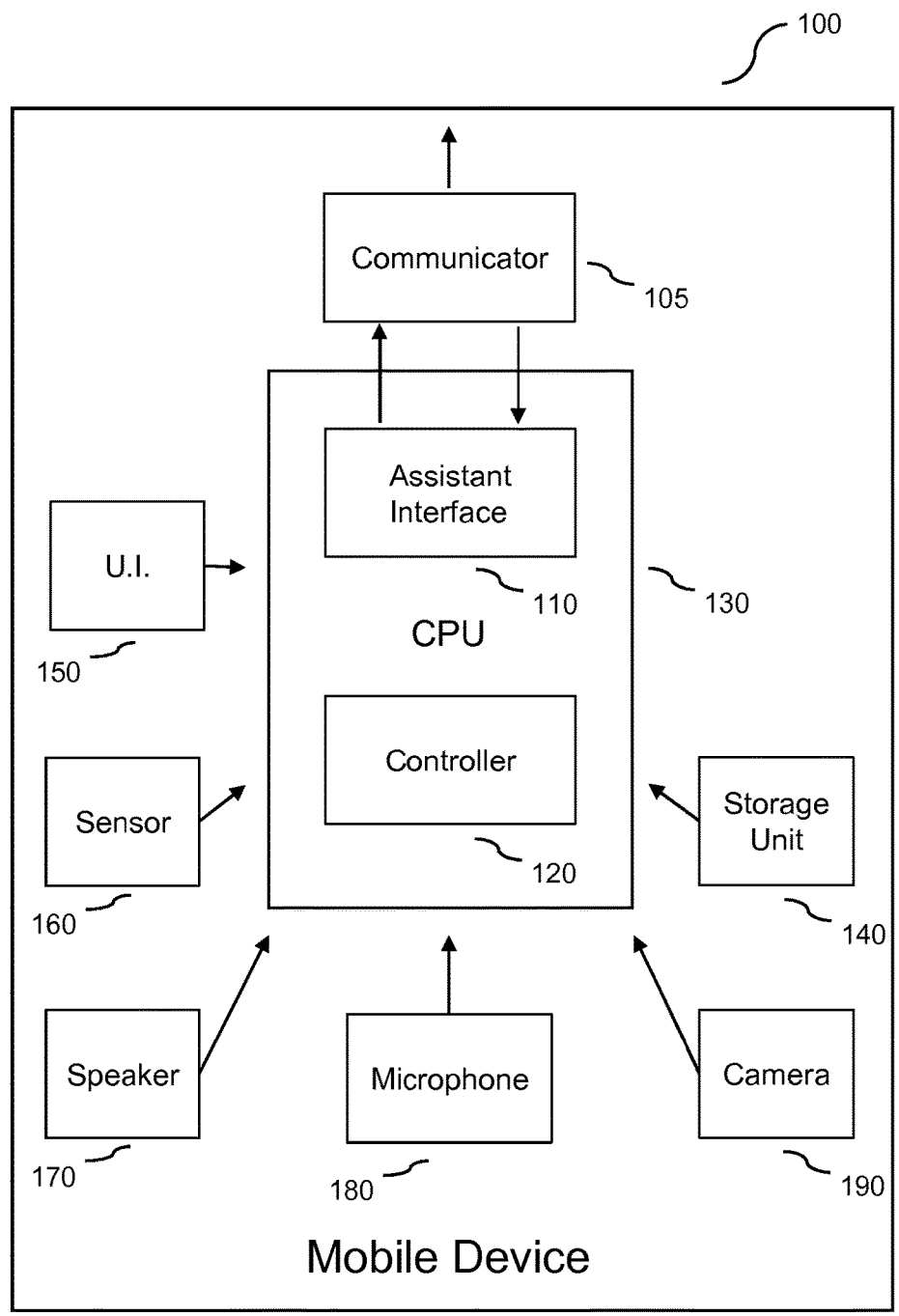
FIG. 2A is a block diagram illustrating an exemplary embodiment of a mobile electronic device usable with the virtual assistant systems illustrated in FIGS. 1A-1B.
Figure 2B:
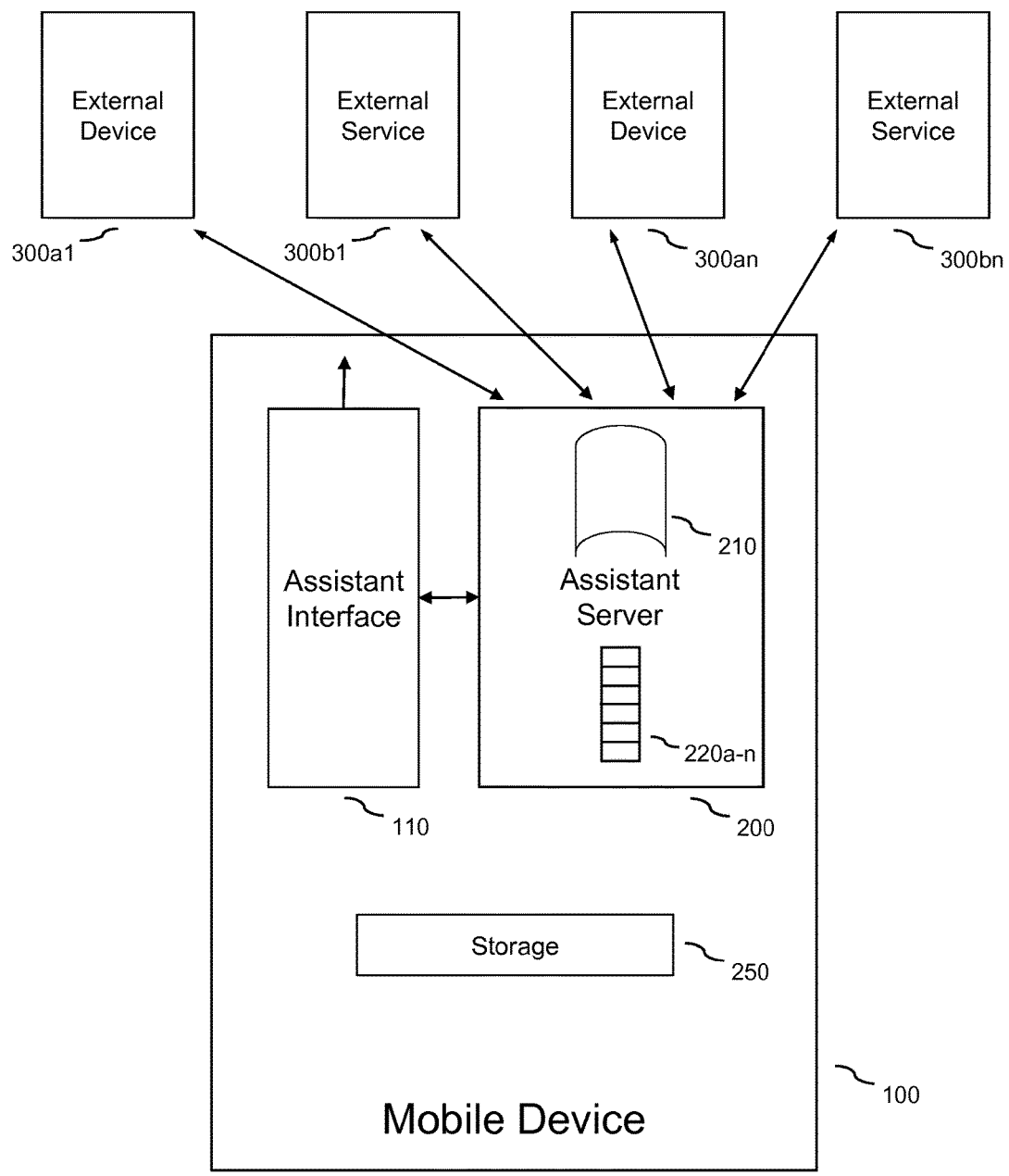
FIG. 2B is a block diagram illustrating another exemplary embodiment of a mobile electronic device.

Alternatively, as illustrated in FIG. 2B, the assistant interface 110 may be provided on the same hardware installation as the assistant server 200. In other words, the assistant server 200 may be provided at the mobile device 100 together with the assistant interface 110, in which case the assistant interface 110 is not required to communicate with any backend-type server system in order to understand the actions required to take in order to perform any functions at a device 300a or service 300b. Thus, in the exemplary embodiment as illustrated in FIG. 2B, to be discussed in more detail below, the virtual assistant system 10 may be entirely self-contained in a mobile type device as defined above.

The assistant server 200 is a server that may include a computer, a dedicated computer (i.e., a back-end server), or a plurality of computers, running one or more application(s) (i.e., software) that allows communication with the mobile device 100 via the Internet, and also allows communication with an infinite range of external devices 300a and services 300b (i.e. a television, a mobile device application, etc.) via the Internet. The assistant server 200 described here and illustrated in FIGS. 1A and 1B has an open type platform 210, i.e. a facility whereby any software engineer (also referred to as the software developer) may create a connector (a "plugin" 220) therein to correspond with any device(s) 300a or service(s) 300b. The assistant server platform 210 and plugins 220 may be included all together in one hardware configuration of the assistant server 200.

It is well known that each of the external devices 300a and services 300b used throughout the world have their own corresponding proprietary language as well as specific credentials which are required to control/operate the respective external device 300a or service 300b. Each plugin 220 allows the assistant server 200 to communicate with the respective external device 300a or service 300b in its respective proprietary language via the Internet, WiFi, Bluetooth, WiFi direct, HDMI, USB, FireWire, NFC or other means in order to execute a user's wishes, either explicit or inferred by the virtual assistant system 10. The plugin 220 also can provide the assistant server 200 with any proprietary language information regarding the corresponding external device 300a or service 300b, including specific credentials, which may be necessary in order to permit security access to the desired device or service to be controlled.

The various plugins 220a-n correspond to various devices, services, programs, and applications, but are not limited thereto. An engineer/developer may create such a plugin 220 at the assistant server 200 to allow the assistant server 200 to communicate with the corresponding external device 300a (or service 300b) in its respective proprietary language. The engineer/developer will create the plugin 220 for the corresponding device 300a or service 300b based on specifications of the external device 300 or service 300b. Accordingly, an infinite number of plugins 220 can be created at the assistant server 200 to allow a user to control the various respective devices 300a1-n and services 300b1-n in the manner described above.

The assistant server 200 also has a designated storage 250 (illustrated in FIG. 4) associated with it. The storage 250 may be included as part of the assistant server 200 (i.e. a back-end server), or it may be an external storage which the assistant server 200 can access, such as, for example, an external server, a remote storage device or a cloud storage service. The software engineer can select from a predefined library of command inputs which are stored in the designated storage 250 in order to define a command set 240 (illustrated in FIG. 4) which allows the user to present corresponding commands to each external device 300a1-n and service 300b1-n via the assistant server 200. The library of command inputs may include any inputs which may be received by the mobile device 100. The command inputs may include gestures and icons, as well as audible or voice commands (stored as actionable data), and other forms of commands, which are stored in the storage 250 (to be described in more detail below with respect to FIG. 4) associated with the assistant server 200, to define a command set 240 which allows the user at the mobile device 100 to present these selected commands to the respective external devices 300a1-n and services 300b1-n via the assistant server 200. In other words, the storage 250 stores a vast vocabulary of gestures and icons (and voice data) in the form of a common vocabulary format which can be selected from by the software engineer in order to create separate command sets 240a-n associated with an external device 300a or service 300b. These commands are selected to create a command set 240 to correspond with respective functions that can be performed at the external devices 300a and services 300b. The commands stored in the storage 250 can also be shared between an infinite number of the external devices 300a1-n, services 300b1-n and mobile devices 100a-n.

As will be described below with respect to FIG. 1B, under certain predefined situations, these specific commands from the defined command set 240 can be presented to the corresponding external device 300a or service 300b directly from the mobile device 100 through the assistant interface 110 in a local control mode. The assistant server 200 also provides assistance in this local mode, as will be described in more detail infra.

As pointed out above, the selections of commands by the engineer can be grouped together and saved in the storage 250 as separate command sets 240a-n, which can be specific to the corresponding device 300a and service 300b (illustrated in FIG. 4). In other words, storage 250 can be configured with a vast vocabulary of gestures, icons, voice data, and other type commands provided in a common vocabulary format, which can be shared between all devices 300a and services 300b which are connected to the assistant server 200. This common vocabulary format of commands will be hereinafter referred to as a "semantic information interchange language format," from which a software engineer may select from while creating a plugin 220 in order to create a command set to be associated with the various functions or operations that the corresponding external device 300a and service 300b can perform.

The semantic information interchange format language used at the assistant sever 200 allows the assistant interface 110, provided within the mobile device 100, to communicate the many gestures, icon touches, voice data, etc., from the mobile device 100 (in raw input form) to the assistant server 200 since the assistant interface 110 translates the received gestures, icon touches, voice data, etc. into this created semantic information interchange format language in order to communicate all types of information relevant to different devices 300a1-n and services 300b1-n therebetween via a single language within the assistant server 200.

The semantic information interchange format language allows the assistant server 200 to function as a universal translator between the various devices 300a and services 300b. More specifically, the semantic information interchange format language can be used for communication between the assistant server platform 210 and each of the plugins 220 for all of the devices 300a1-n and services 300b1-n for which a plugin 220 is created at the assistant server 200. In this manner, various external devices 300a1-n and/or services 300b1-n may communicate information between each other or with the mobile device 100 (and other mobile devices 100a-n), which will be described in more detail infra.

The assistant server 200 may include any type of master/slave arrangement as predetermined by a user. This may be predetermined by the end-user, or someone that is managing the assistant server can also set up the arrangement of the assistant server 200 in a predetermined way. The assistant server 200 may also be connected to any number of mobile devices 100a-n, and may therefore facilitate communication between these mobile devices 100a-n, as will be described in greater detail infra.

As described above, the storage 250 can store various languages, icons, gestures, sensor-commands, key-strokes, voice data commands, programs, applications, etc., as well as libraries including any combinations of the above items and commands in the semantic information interchange language format. These items and commands are associated with any commands that can be instructed by a user by inputting such a command at the mobile device 100, which then sends the input command to the assistant server 200 via the assistant interface 110 after being translated into the semantic information interchange language format by the assistant interface 110. Alternatively these items or commands can be obtained by the mobile device 100 via another source (i.e., sensors 160, to be described in more detail below with reference to FIGS. 2A, 3A-3B, and 6) and then presented to the assistant server 200 via the assistant interface 110 after being translated into the semantic information interchange language format by the assistant interface 110.

As pointed out above, the assistant interface 110 first translates an input command into the semantic information interchange language format. Once the command is provided to the assistant server 200, the command may be converted to the appropriate proprietary language at the corresponding plugin 220. The proprietary language command provided by the plugin 220 contains within it specific credentials with respect to the device 300a or service 300b, such as, for example, where the device 300a or service 300b is located, the IP address of the device 300a or service 300b, and/or any other information that may be required to permit the virtual assistant system 10 to directly control the desired device 300a or service 300b. Thus, each plugin 220 can be created by an engineer to contain specific credentials of the corresponding device 300a or service 300b required in order to communicate with and operate the device 300a or service 300b.

In other words, any type of gesture, icon touch, voice, keyboard input, or other input command input at the mobile device 100 or through the mobile device 100 (a raw input command) by another sensor type device, can be first translated into the semantic information interchange format language via the assistant interface 110. Once the semantic information interchange language format command is recognized within the assistant server 200, it can be translated at each plugin 220 created for the corresponding external device 300a (or service 300b) to the proprietary language (including any necessary credentials) of the corresponding external device 300a (or service 300b). Using the proprietary language format (including any necessary credentials) of the input command, the intended function/operation desired to be performed at the corresponding external device 300a or service 300b can be performed.

As illustrated, for example, in FIG. 1A, the assistant server 200 may communicate directly with the external devices 300a1-n or services 300b1-n by converting the received commands in the semantic information interchange format language to the corresponding proprietary language at the plugins 220. In this exemplary embodiment, the mobile device 100 is configured to be part of the virtual assistant system 10 by communicating with the assistant server 200 through the assistant interface 110. The assistant server 200 can control (via a plugin 220) any number of the external devices 300a1-n and services 300b1-n included within the virtual assistant system 10 via an Internet or any other type of wireless connection, as described above, which the assistant server 200 shares with the external devices 300a and services 300b. Furthermore, the assistant server 200 can provide interaction (share information) between each of any number of the external devices 300a and services 300b included within the virtual assistant system 10 using the semantic information interchange format language. These external devices 300a and services 300b should be connected to the assistant server 200 via an Internet or other type of wireless connection, as described above.

Alternatively, the assistant interface 110 may directly perform functions associated with an input command at the device 300a or service 300b. FIG. 1B is a block diagram illustrating this exemplary embodiment of the present general inventive concept. As illustrated therein, the mobile device 100 is configured to be part of the virtual assistant system 10 by communicating with the assistant server 200 through the assistant interface 110, similar to the exemplary embodiment of FIG. 1A. However, in this exemplary embodiment, when it is determined that the mobile device 100 is within a certain range of a particular external device 300a or service 300b desired to be controlled, or within a common network of the device 300a or service 300b, the assistant server 200 can communicate back to the mobile device 100 to permit the mobile device 100 to perform direct control of the external devices 300a and services 300b, similar to the way a remote control device would perform these controls (i.e. a television and corresponding remote control device).

More specifically, if a location based communication service (i.e., NFC, Bluetooth, etc.) is established between the mobile device 100 and a desired external device 300a or service 300b to be controlled, this "established proximity" communication information can be provided to the assistant server 200 through the assistant interface 110. The assistant server 200 can then provide control access of the desired external device 300a or service 300b to the mobile device 100 directly. In this situation, the plugin 220 corresponding to the device 300a or service 300b can first embed the necessary proprietary language information into the semantic information interchange format language so that the assistant server 200 can provide this information to the mobile device 100 through the assistant interface 110. Here the semantic information interchange format language can be translated into the proprietary language which the mobile device 100 can use to control the device 300a or service 300b. As a result, the mobile device 100 can directly control the desired external device 300a or service 300b in the same fashion as a hand-held remote control specifically designed for the device 300a or service 300b would control the device 300a or service 300b.

A more detailed overview of the control process of the virtual assistant system 10 is provided below with reference to FIGS. 5A and 5B.

The external device(s) 300a or service(s) 300b may include any type of device or service that is connectable to the mobile device 100 and/or the assistant server 200 via a local network or the Internet, or other wireless form of communication, as described above. Examples of devices 300a and services 300b for which plugins 220 may be created include home and office systems (i.e., security, lighting, thermostats), automotive devices, apps, wearable devices, online services, etc. This list of devices 300a and services 300b are provided as examples only, and are far more expansive to millions of other devices and services.

Services 300b, such as, for example, "apps," usually found on smart phones, are accessible via the Internet and the mobile devices 100a-n themselves, and devices 300a, including, but not limited to, home appliances, lights, etc. are also capable of being Internet-accessible by being supplied with a wireless chip or other Internet-accessible device. This concept has been recognized and is currently being referred to in discussions relating to "the internet of things," also referred to as IoT. Such devices 300a are also accessible via a local network type of communication so that the mobile device 100 may ultimately control the device 300a directly once the proprietary language including necessary credentials is obtained by the mobile device 100.

It is to be noted that an infinite number of external devices 300a1-n and services 300b1-n may be accessed and controlled by the virtual assistant system 10, and any number of mobile devices 100a-n can be included into the virtual assistant system 10 to access and control the infinite number of external devices 300a and services 300b. Access to the devices 300a and service 300b may also be shared between mobile devices 100 (see dotted lines "sharing access" in FIG. 1A), as will be described in more detail infra.

As pointed out above, the semantic information interchange format language created within the assistant server 200 acts as a universal interchange format type language to allow communication and exchange of information between external devices 300a and services 300b through the assistant server 200 via respective plugins, between the mobile device 100 and the assistant server 200, between the mobile device 100 and any of the infinite number of external devices 300a and services 300b, and between mobile devices 100a-n. An example of a list of input commands can include the following: a voice command can be captured by a microphone connected to or part of a mobile device (such as a smartphone or tablet) or other computing hardware. Gestures can be captured by a camera, motion detector, proximity detector, infrared sensor, temperature sensor, global positioning device, or any other photo-detecting device that is capable of capturing information about a user's movements, which is in turn connected to a mobile or other computing device. Gestures may also be captured by wearable, held, or other devices that detect movement by using accelerometer hardware or other movement-tracking hardware, or even eye-tracking, lip-tracking or facial-tracking systems. Icons can be touched or clicked either by hand or a stylus on a touch sensitive service (such as that of a mobile device or other touchscreen) or by means of a click by positioning a mouse or roller-ball on top of the icon. In addition, it is possible that the user may use voice alone, gestures alone or icons alone, or any combinations thereof to make the assistant do these tasks. For example, a user may gesture upwards at a camera to which the assistant has access to indicate that a thermostat controlled by the assistant should raise the temperature. Alternatively, for example, this gesture can be detected by means of an armband or other wearable device.

In creating a command set for a plugin 220, an engineer/developer may select from gestures that are part of the predefined semantic information interchange format language specified within the assistant server system 10. For example, if one closed first and two closed fists are part of the predefined semantic information interchange format language stored in the virtual assistant system 10, an engineer/developer may select a gesture of closing a first to represent the locking of a door and closing two fists to represent engaging a deadbolt.

As another example, a user may hold a picture up to a camera (associated with the user's mobile device 100) and with a waving gesture instruct the assistant server 200 to identify a person in the picture via a face-recognition program (a service, i.e., an "app") to which a plugin 220 has been created. This specific gesture of waving a picture together with using such a face-recognition program will have been previously provided within the semantic information interchange format language of gestures stored in the storage 250. Then this gesture may be selected by an engineer while creating a plugin for a face recognition type device 300a or service 300b.

Because the library of commands programmed at the assistant server 200 in the semantic information interchange format is constant across a limitless (thousands or even millions) number of plugins, similar commands emerge for similar concepts. As an example, two separate plugins 220 could be respectively created for a door and a billboard, respectively, in a public square, and stored within the assistant server 200. If, for example, closing a first is associated with the concept of shutting down or closing up for the day, a user may then utilize a same gesture of closing a first to signify locking the door as well as shutting down the billboard, depending on whether the user wishes to control the door or the billboard.

Since plugins 220 are created for both the door and the billboard (as well as an infinite number of other devices, services, programs, applications, etc.), both the door and the billboard are able to understand the commands initiated by the user through the mobile device 100, as the assistant server 200 acts as a translator or an interpreter (via the semantic information interchange format language created in the assistant server 200, based on the library of gestures, icons, and other command inputs stored therein) between the mobile device 100 and the door and the billboard. More specifically, the assistant server 200 acts as the translator between the infinite number of external devices 300a, services 300b, etc., and the mobile device 100 by using the semantic information interchange format language. As pointed out above, the semantic information interchange format language (the common vocabulary between all devices, services, etc.) is specifically created within the assistant server 200 to allow communication between the assistant server platform 210 (see FIG. 1A) and each of the plugins 220a-n for all of the devices 300a1-n and services 300b1-n in which a plugin 220 is created at the assistant server 200, and between the assistant server platform 210 and the assistant interface 110.

FIG. 2A is a block diagram illustrating an exemplary embodiment of a mobile device 100 in detail for purposes of describing how the mobile device 100 is configured to be a part of the virtual assistant system 10 illustrated in FIGS. 1A and 1B.

The mobile device 100 may include the assistant interface 110, a communicator 105, a controller 120, a central processing unit (CPU) 130, a storage unit 140, a user interface 150, a sensor 160, at least one speaker 170, at least one microphone 180, and at least one camera 190.

Referring to FIG. 2A, the communicator 105 can be used to establish a connection with the assistant server 200 and/or an external device 300a or service 300b. The communicator 105 may include an antenna or any type of communication device to establish the connection with the assistant server 200 and the external device 300a using Wi-Fi, Wi-Fi direct, NFC, Bluetooth, RFID, Ethernet, FireWire, universal serial bus (USB), high definition multimedia interface (HDMI), or any other type of wireless or wired communication method, but is not limited thereto. The communications between the mobile device 100, the assistant server 200, and any external device(s) 300a and service(s) 300b may be performed via the Internet, including cloud computing applications, satellite, etc.

The controller 120 may control communications between the mobile device 100 and the assistant server 200, as well as control communication between the mobile device 100 and the external devices 300a or services 300b under certain conditions being met, such as a location based communication service (i.e., near field communication (NFC), Bluetooth, etc.) being established, as described above with respect to FIG. 1B.

The controller 120 determines which device the assistant interface 110 is communicating with in order to interpret a received request whether the request is received in a proprietary language format or in the semantic information interchange language format. Although the device which the assistant interface 110 is communicating with is often the assistant server 200, the libraries of possible inputs (icons, gestures, voice commands, with interpretations) could be obtained from a different server or from another assistant interface 110a-n on a separate mobile device 100a-n. For example, multiple assistant interfaces 110a-n could work collaboratively: i.e., once one assistant interface 110a has learned how to interpret an input, this assistant interface 110a could share the input(s) with another assistant interface. Accordingly, the controller 120 determines what device the assistant interface 110 is talking to in order to provide these features.

The controller 120 can thus make a determination that the assistant interface 110 should reach out to an external source other than the assistant server 200 under certain circumstances. For example, if the assistant interface 110 is determined by the controller 120 to be receiving an input request that requires information from another assistant server 200a-n or another assistant interface 110a-n, the controller 120 may dictate to the assistant interface 110 to reach out to that external other source. The assistant interface 110 would accordingly connect to the external other source by way of the communicator 105 and present the request. The external other source will check the full set of libraries to interpret this request (gesture, icon touch, voice data, etc.), and if found, the external other source will respond to the assistant interface 110 and tell it what to do in the semantic information interchange language format (with proprietary language embedded therein). At this point if the mobile device 100 is operating through the assistant server 200 as illustrated in FIG. 1A, the assistant interface 110 will provide the command to the assistant server 200 to perform the command on the intended external device 300a or service 300b. Alternatively, if the mobile device 100 is operating in a local control mode as illustrated in FIG. 1B, the assistant interface 110 can then connect with the device 300a through the communicator 105 and directly control the intended external device 300a or service 300b using the properly obtained proprietary language.

The CPU 130 may request the virtual assistant system 10 to run applications and/or programs, perform various functions of the mobile device 100, and adaptively learn various commands based on the user's preferences, among various other uses. The CPU 130 may also run various operating systems that may be changed, altered, or personalized, based on the user's preferences. Further, when there are a plurality of external devices 300a1-n and/or services 300b1-n in which the user desires to control, the CPU 130 may perform various functions specifically corresponding to the plurality of external devices 300a and/or services 300b, based on respective user commands.

The storage unit 140 may store the commands learned by the CPU 130, as well as the various languages, icons, gestures, sensor-commands, programs, applications, commands, and libraries including any combinations of the above items, that are downloadable by the mobile device 100 from the assistant server 200. For example, if the mobile device 100 does not possess a specific command among the library of commands within the assistant server 200 to control a particular device 300a or service 300b, the mobile device 100 can download any single command or set of commands from the assistant server 200, at which point the mobile device 100 can directly control the device 300a or service 300b, or at least have a more extensive library of commands to understand a command being input to the mobile device 100. In other words, if a user of the mobile device 100 makes a gesture or provides a voice command which is not a readily known command to the mobile device 100, the assistant server 200 can recognize the correct command by checking within the extensive library of commands, while considering various contexts of the command and the user information collected via the history of information previously gathered, as described above. Then, with the help of a corresponding plugin 220, the assistant server 200 can generate the command in the semantic information interchange language format with the proprietary language embedded therein. The command can then be provided to the mobile device 100, at which point the mobile device 100 can download the correct command into the storage unit 140, translate the command to the proprietary language of the device 300a or service 300b via the assistant interface 110, and then apply the perform an intended function at the device 300a through the communicator 105 by using the proprietary language of that device 300a.

The user interface 150 allows a user to perform various functions on the mobile device 100, including displaying selectable icons, making telephone calls, accessing the Internet to view various web pages, playing multimedia such as music and movies, viewing pictures, running programs, controlling an external device 300a or service 300b, accessing the assistant server 200, modifying the mobile device 100, etc., but is not limited thereto. The user interface 150 may include a screen, a keyboard, a keypad, a mouse, a trackball, a touch screen, an audio interface (for example with the at least one microphone 180), a hologram interface, a sensing interface, etc., but is not limited thereto. Moreover, the user interface 150 may include any combinations of the various types of aforementioned user interfaces.

The sensor 160 may be configured to sense a sound, gesture, or touch of the user. The sensor 160 may work in conjunction with facial recognition software running on the CPU 130 to allow the mobile device 100 to recognize facial expressions of the user, or a ring type device, such as, for example, Fin™, which is a Bluetooth enabled device that can provide commands from gestures made by a user. In this example, the commands can be received by the CPU 130 and translated into the semantic information interchange language format by the assistant interface 110. Additionally, the sensor 160 may include other types of sensing devices that sense movement of the mobile device 100 itself, such as a gyration, pressure, or proximity of the mobile device 100 to a device 300a to be controlled. Moreover, the sensor 160 may include global positioning system (GPS) technology to sense a location of the mobile device 100. The sensor 160 may include a single sensor having multiple functions, or may be divided into a plurality of different sensors based on the user's preference. The sensor 160 is described in greater detail below with reference to FIG. 3A.

The mobile device 100 may further include the at least one speaker 170 to allow the user to hear audio emitted from the mobile device 100, the at least one microphone 180 to allow the user to speak into the mobile device 100, and the at least one camera 190 to allow the user to capture images. The at least one speaker 170 and the at least one microphone 180 may be used to perform telephone operations, and may also be used to receive audio commands (for example voice commands) from the user that may be processed by the CPU 130. The at least one camera 190 may be used to photograph still or moving objects, to perform webcam communications with other users using applications such as Skype or GChat, or to receive/read gestures and/or facial features from the user that may be processed by the CPU 130.

The assistant interface 110 (also referred to as "Client"), as described above with respect to FIGS. 1A-1B, can perform the operations of a plugin by translating input commands into the semantic information interchange language format and can communicate with the assistant server 200 using the semantic information interchange format language. Furthermore, the assistant interface 110 can translate any of the commands received at the mobile device 100 by any form of the sensor 160 thereof or received by the mobile device 100 by way of an external sensor, such as, for example only, the wearable ring as described above. The assistant interface 110 also translates data received from the assistant server 200 into a format which may be understood by the mobile device 100, and which may be displayed for example on the user interface 150.

As pointed out above, FIG. 2B illustrates an exemplary embodiment where the mobile device 100 of FIG. 2A may include the assistant server 200 therein as well as the other devices illustrated in FIG. 2A. In this case, the assistant interface 110 is not required to communicate with any backend-type server system in order to understand the actions required to take in order to perform any functions at a device 300*a* or service 300*b* when operating in a local mode. Thus, in this exemplary embodiment illustrated in FIG. 2B, the virtual assistant system 10 may be entirely self-contained in a mobile type device 100, as described above. In the embodiments described above with reference to FIGS. 1A-1B and 2A, the interaction between the assistant server 200 and the assistant interface 110 would normally occur over the web. However, in this exemplary embodiment illustrated in FIG. 2B, the interaction between the assistant server 200 and the assistant interface 110 occurs within the mobile device 100 itself. Furthermore, the storage 250 associated with the assistant server 200 is also provided on the same hardware as the mobile device 100, and is used by the assistant server 200 similar to the way the assistant server 200 uses the storage 250 as described in FIGS. 1A-1B. Thus the storage 250 in FIG. 2B is functionally equivalent to the storage 250 described in FIGS. 1A-1B. Although many of the components of the mobile device 100 of FIG. 2A are not illustrated in the mobile device 100 of FIG. 2B, such as the communicator 105, the CPU 130, the controller 120, the U.I. 150, the sensor 160, the storage unit 140, etc., in order to highlight the differences between the mobile device of FIG. 2A and FIG. 2B, these components are also included in the mobile device of FIG. 2B.

A virtual assistant system 10 according to this exemplary embodiment of FIG. 2B is valuable in cases where communication is poor, such as remote applications, military applications, etc. Since the mobile device 100 and the assistant server 200 of this exemplary embodiment do not rely on wireless communications between each other to perform functions at devices 300*a* or services 300*b*, the probability of failure in controlling an intended device 300*a* or service 300*b* as a result of poor wireless communication services can be eliminated. Furthermore, users who do not want their data to be stored at some remote location may also use this type of setup of the virtual assistant system 10 for security purposes, or other similar reasons. Since no assistant information is being sent wirelessly, it is more secure. This type of setup can also be very valuable in automobiles or aircraft which face varying connectivity situations, i.e., sometimes becoming disconnected from wireless service.

Figure 3A:
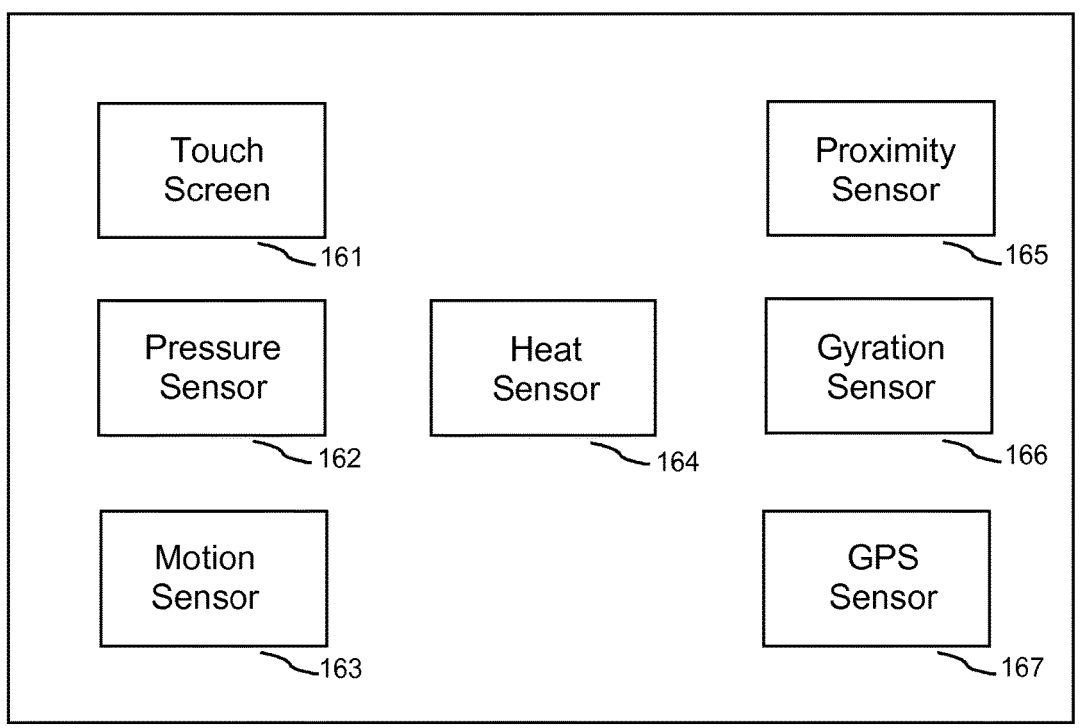
FIG. 3A is a block diagram illustrating an exemplary embodiment of the sensor part of the mobile electronic device of FIG. 2A.
Figure 3B:
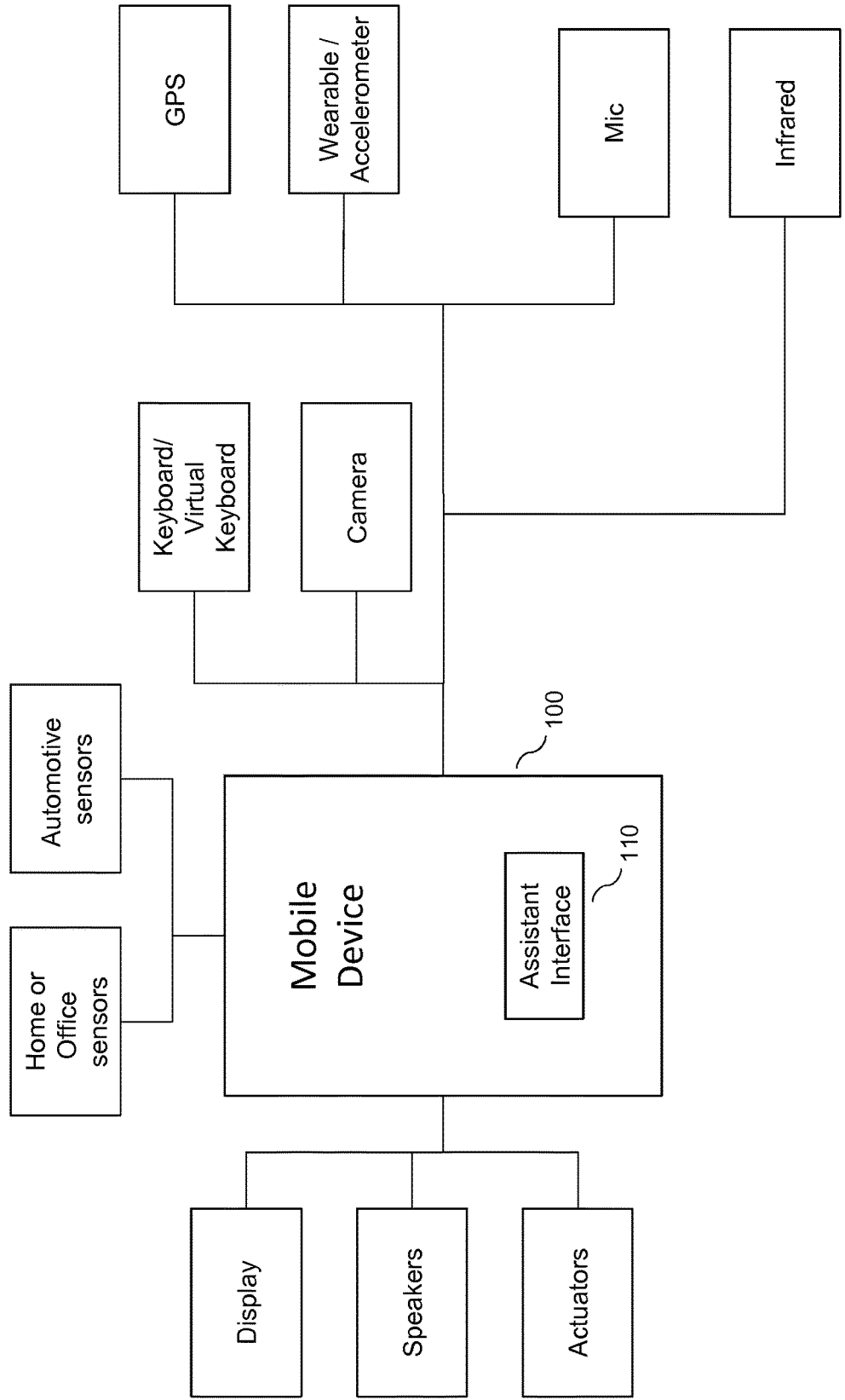
FIG. 3B is a block diagram illustrating an exemplary embodiment of external input sensors and devices usable with the mobile electronic device of FIGS. 2A and 2B.

FIG. 3A is a block diagram illustrating an exemplary embodiment of the sensor 160 of the mobile device 100 illustrated in FIG. 2A. The sensor 160 as illustrated in FIG. 3A can be provided in the form of a plurality of different sensors.

The sensor 160 may include various different sensors located at various locations on the mobile device 100, and may include a touch screen 161, a pressure sensor 162, a motion sensor 163, a heat sensor 164, a proximity sensor 165, a gyration sensor 166, and a global positioning service (GPS) sensor 167.

The touch screen 161 is a display that displays items, icons, and media thereon, while allowing the mobile device 100 to detect a location of the user's finger, stylus, etc., when in contact with the touch screen 161. As such, when the user moves the finger around the touch pad, various commands can be performed on the touch screen 161, such as scrolling through menu items, selecting icons, flipping pages, etc., but is not limited thereto.

The pressure sensor 162 allows the mobile device to detect a pressure at which the touch screen 161 is depressed. As such, different pressures sensed by the pressure sensor 162 can result in different commands executed by the mobile device 100. The pressure sensor 162 may be a component that is separate from the touch screen 161, or may be integrated therein.

The motion sensor 163 can detect a motion of the user or a motion of the mobile device 100 with respect to the user or the external device 300*a*. As such, the motion sensor 163 can actively track the user's movement. The motion sensor 163 may be a component that is separate from the at least one camera 190, or may be integrated therein.

The heat sensor 164 can sense heat from an outside source, which can be processed and interpreted as data by the CPU 130.

The proximity sensor 165 can sense a proximity of the mobile device 100 with respect to other objects and/or users. The proximity sensor 165 may be a component that is separate from the at least one camera 190, or may be integrated therein.

The gyration sensor 166 can sense a motion and/or a direction of motion of the mobile device 100 itself in a three-dimensional space. More specifically, the gyration sensor 166 can sense how the mobile device 100 is moving, thereby allowing the mobile device 100 to be used as a wand-like apparatus to control the external device 300*a* or service 300*b*, for example. For instance, the gyration sensor 166 may sense that the user moves the mobile device 100 from a low position to a high position, and then may send a command through the assistant server 200 to control a television (corresponding to an external device 300*a*) to increase its volume. Alternatively, the motion sensor 163, the proximity sensor 165, and the at least one camera 190 may also be utilized to sense that the mobile device 100 has moved from a low position to a high position and send a corresponding command to the assistant server 200.

The GPS sensor 167 can sense a location of the mobile device 100 using GPS technology, in order to substantiate an exact location of the mobile device 100. When the location of the mobile device 100 is substantiated, the assistant server 200 can determine which external devices 300a and services 300b can and/or should be controllable by the mobile device 100, and which types of commands can and/or should be utilized to perform the controls.

According to an exemplary embodiment, if a user is operating the mobile device 100 outside his/her house and wants to open a garage door (a device 300a) which is wirelessly connected to the assistant server 200, the user may give a "thumbs up" hand sign to the at least one camera 190, or using another form of sensor, at which point the assistant interface 110 translates and provides the command to the assistant server 200 to communicate the command to the garage door plugin, causing the garage door to open. The "thumbs up" hand sign is interpreted to signify "garage door open" at this point because the GPS sensor 167 can sense that the mobile device 100 is outside the user's house. However, if the user is inside the house, the same "thumbs up" hand sign can be used to close the garage door at this point because the GPS sensor 167 can sense that the user is inside the house. Therefore, the same hand sign or other gesture can be used to perform different functions corresponding to a single external device 300a, based on a location of the mobile device 100 sensed by the GPS sensor 167.

As another exemplary embodiment, a sprinkler system service 300b could be controlled differently based on a location of the mobile device 100. More specifically, if the GPS sensor 167 senses that the mobile device 100 is near the user's home and the user touches a sprinkler system icon displayed on the user interface (UI) 150 of the mobile device 100, the sprinkler system can be shut off to allow the user to walk on the lawn without getting wet. If the user is far from the home and the user touches the same sprinkler system icon displayed on the UI 150 of the mobile device 100, the sprinkler system may turn on, causing water to spray onto the lawn. Alternatively, the user could preset an automated sprinkler system function based on the GPS sensor 167 sensing a location of the user.

It will be understood that the sensor 160 may include any combination of the sensing devices illustrated in FIG. 3A, or additional sensing devices not illustrated, according to the particular exemplary embodiment of the present general inventive concept. For example, gestures can be detected by the at least one camera 190, as well as a photo-detection device, a wearable device such as an armband or Fin™, or using an accelerometer or other movement detection device in the mobile device 100. In the exemplary embodiment of the present general inventive concept illustrated in FIG. 3B, the mobile device 100 is connected to a plurality of external input sensors and devices. For example, the mobile device 100 may be connected to external sensors in a user's home, office, or car in order to receive data therefrom which it would not be able to receive with its own sensor 160. External sensing devices, such as a keyboard, camera, GPS, wearable sensor, microphone, and/or infrared sensor would connect the mobile device 100 to alternate sensing devices to accept a user input. In this way, the functionality of the user's mobile device 100 can be greatly expanded.

Furthermore, the mobile device 100 may receive input commands from external devices, such as one or more displays, speakers, and actuators. The inputs from these external devices can be processed by the CPU 130 to determine such a command being received from the respective external device.

As described above, gestures may also be captured by wearable, held, or other devices that detect movement by using accelerometer hardware or other movement tracking hardware, or even eye-tracking, lip-tracking or facial-tracking systems. Icons are usually touched or clicked either by hand or a stylus on a touch sensitive service (such as that of the user interface 150 of the mobile device 100 illustrated in FIG. 2A, or some other form of a touchscreen) or by means of a click by positioning a mouse or roller-ball on top of the icon. It is possible that the user may use voice alone, gestures alone or icons alone, or any combinations thereof to make the assistant server 200 perform these tasks at the device 300a or service 300b (i.e., the above example of the combination of using a GPS together with a sensor to sense the "thumbs-up gesture"). As another example, a user may gesture upwards at a camera to which the assistant server 200 has access to indicate that a thermostat controlled by the assistant server 200 should raise the temperature. Or this gesture can be detected by means of an armband or other wearable device.

FIG. 4 is a block diagram illustrating an exemplary embodiment of an assistant server 200 in detail for purposes of describing how the assistant server 200 is configured to be a part of the virtual assistant system 10 illustrated in FIGS. 1A and 1B.

The assistant server 200 illustrated in FIG. 4 may include the assistant server platform 210 and the plugins 220a-n.

The assistant server platform 210 may be any device or combination thereof that allows a software developer to create the plugins 220 at the assistant server 200. The assistant server platform 210 may, for example, be a CPU or other computing device used to process commands as well as communicate with devices and services via the semantic information interchange format language. Similarly to the CPU 130 in the mobile device 100, the assistant server platform 210 can be continuously running a learning algorithm or algorithms.

Although plugins 220a-n are illustrated in FIG. 4 as being separate from the assistant server 200, this illustration is provided merely to illustrate the infinite number of plugins 220 that may be created and their association with a specific device 300a or service 300b. These plugins 220 are generally created at the assistant server 200.

As discussed above, the storage 250 may be provided on the same hardware or cloud service as the assistant server 200, or may be separately located and accessible by the assistant server 200, as illustrated in FIG. 4. The storage 250 may be, for example, a hard drive included in the assistant server 200, or an external storage device which is connected to the assistant server 200, for example a flash drive or a cloud storage server. The storage 250 may also be a plurality of storage devices connected to the assistant server 200. The storage 250 stores the library of commands 230 used to control the devices 300a and services 300b.

The library 230 may be divided into multiple divisions for different types of inputs. For example, the library 230 may be divided into a library of icons, a library of voice/word inputs, and a library of gestures.

The storage 250 may also include separate command sets 240a-n corresponding to devices 300a1-n and services 300b1-n. Each of the numerous command sets 240a-n includes the specific commands (associated with inputs) which may be used to control a particular one of devices 300a1-n or services 300b1-n.

In order to control a particular device 300*a* or service 300*b*, the user may connect the mobile device 100 to the assistant server 200 and download the appropriate command set 240. This connection may be achieved via the Internet by using a Wi-fi, Wi-fi direct, NFC, Bluetooth, RFID, or any other type of wireless or wired connection. The downloaded command sets 240 may be saved in the storage unit 140, either automatically or after a user acceptance command. Once downloaded, the command sets 240 may be used by the assistant interface 110 to translate received inputs into the semantic information interchange format language.

The storage 250 may also store usage data on the virtual assistant system 10, including context data (such as a time or a user's physical location when certain commands are entered), which inputs are given incorrectly (which inputs are immediately undone, etc.), and so on. This usage data may be made available to plugin developers so that the developers may then update the library 230 accordingly to reflect this usage data.

The storage 250 may also store updates to the library 230 generated through use of the virtual assistant system 10. As noted above and discussed in detail infra, the virtual assistant system 10 may define additional inputs, such as gestures, depending on user behavior, which may be stored in the storage 250.

A process of determining the intention of an input command and carrying out the corresponding operation at an external device 300*a* or service 300*b* will be described while referring to FIG. 5A. Referring to FIG. 5A, when a command is input at the mobile device 100 directly through the sensor 160 or via an external sensor (operation S500), the assistant interface 110 first translates the command input at the mobile device 100 into the semantic information interchange language format so that the command can be shared among devices 300*a*1-*n* and services 300*b*1-*n* connected to the assistant server 200. As described above, the command input at the mobile device 100 may be an icon touch, gesture, voice data, or any other input provided at the mobile device 100 in which a sensor part can receive the input.

The assistant server 200 receives this translated command (operation S510). The connection between the mobile device 100 and the assistant server 200 may be automatic, or alternatively, the user may be prompted on the mobile device 100 to initiate and/or accept the connection to the assistant server 200.

The assistant server 200 then determines if the virtual assistant system 10 is operating in a remote mode or a local mode (operation S520). The determination of whether the virtual assistant system 10 operates in remote mode or local mode can include, for example, whether the assistant server 200 is permitted within the firewall of the device 300*a* or service 300*b* or if the assistant interface 110 is connected within a local network (such as Bluetooth or NFC) to the device 300*a* or service 300*b*.

If the assistant server 200 determines that the virtual assistant system 10 is operating in remote mode (REMOTE at operation S520), the assistant server 200 can confirm recognition of the command(s) originating at the mobile device 100 by checking among the semantic information interchange language format library of commands at operation S530*a*.

If the received command is recognized at the assistant server 200 (YES at operation S530*a*), the assistant server 200 can then perform the desired command instructed (operation S540*a*) at the intended external device 300*a* or service 300*b* via the corresponding plugin 220 created at the assistant server 200, when the virtual assistant system 10 is in the remote mode of operation.

Alternatively, if it is determined that there exists any confusion as to what the command received from the mobile device 100 is intended to refer to (NO at operation S530*a*), for example, there may be more than one device 300*a* or service 300*b* which uses the same command, the assistant server 200 can examine the command in a number of contexts by considering, among other things, the historical usage pattern of this command, the particular user providing this command, the particular location in which the command is given, the specific time of day in which the command is given, whether this particular user providing the command always uses this specific gesture to perform a specific function at a specific device 300*a* or service 300*b*, etc., at operation S560*a*. In other words, the assistant server 200 will examine all accessible contextual information available within a program running at the platform 210 of the assistant server 200 regarding this received command in order to determine specifically what possible options could have been intended by the received command.

Once the assistant server 200 determines which possible options could have been intended by the command input at the mobile device 100, the assistant server 200 provides these options of intended commands back to the mobile device 100 (operation S570*a*) so that the options can be displayed at the user interface (UI) 150 at the mobile device 100. Here the user can once again input the intended command, but this time with specific accuracy by selecting one among a few displayed options. As an example, a list of icons could be displayed on the mobile device representing the possible commands, and the user could select one icon as the intended command. The assistant server 200 may also record the user's selection so that the original command input in operation S500 will be recognized if it is input again later (a collection of history data to form contexts). This is discussed in greater detail below with reference to FIG. 7.

The specifically intended command is then translated at the assistant interface 110 (into the semantic information interchange language format) and provided to the assistant server 200, where the command is received at the assistant server 200 (operation S580*a*) to carry out this command in the remote mode of operation of the virtual assistant system 10. In other words, when the virtual assistant system 10 is in remote mode, at operation S540*a*, the assistant server 200 may present the command to the corresponding plugin 220, which converts the command from the semantic information interchange format language to the proprietary language in which the external device 300*a*1 or service 300*b*1 understands. The assistant server 200 then can perform the intended command, i.e., the assistant server 200 can communicate directly with the external device 300*a*1 or service 300*b*1 in the respective proprietary language of the device or service to perform any functions or operations instructed at the mobile device 100 (or other type sensor device which is connected to the virtual assistant system 10 and can provide a command input, which will be described in more detail infra).

Information received from the device 300*a* or service 300*b* as part of carrying out the command in operation S540*a* is converted from the proprietary language to the semantic information interchange format language at the corresponding plugin 220. If additional operations are requested at other devices or services using this information (YES at operation S550*a*), additional commands input into the mobile device 100 are received at operation S510 to perform the additional commands.

Figure 5B:
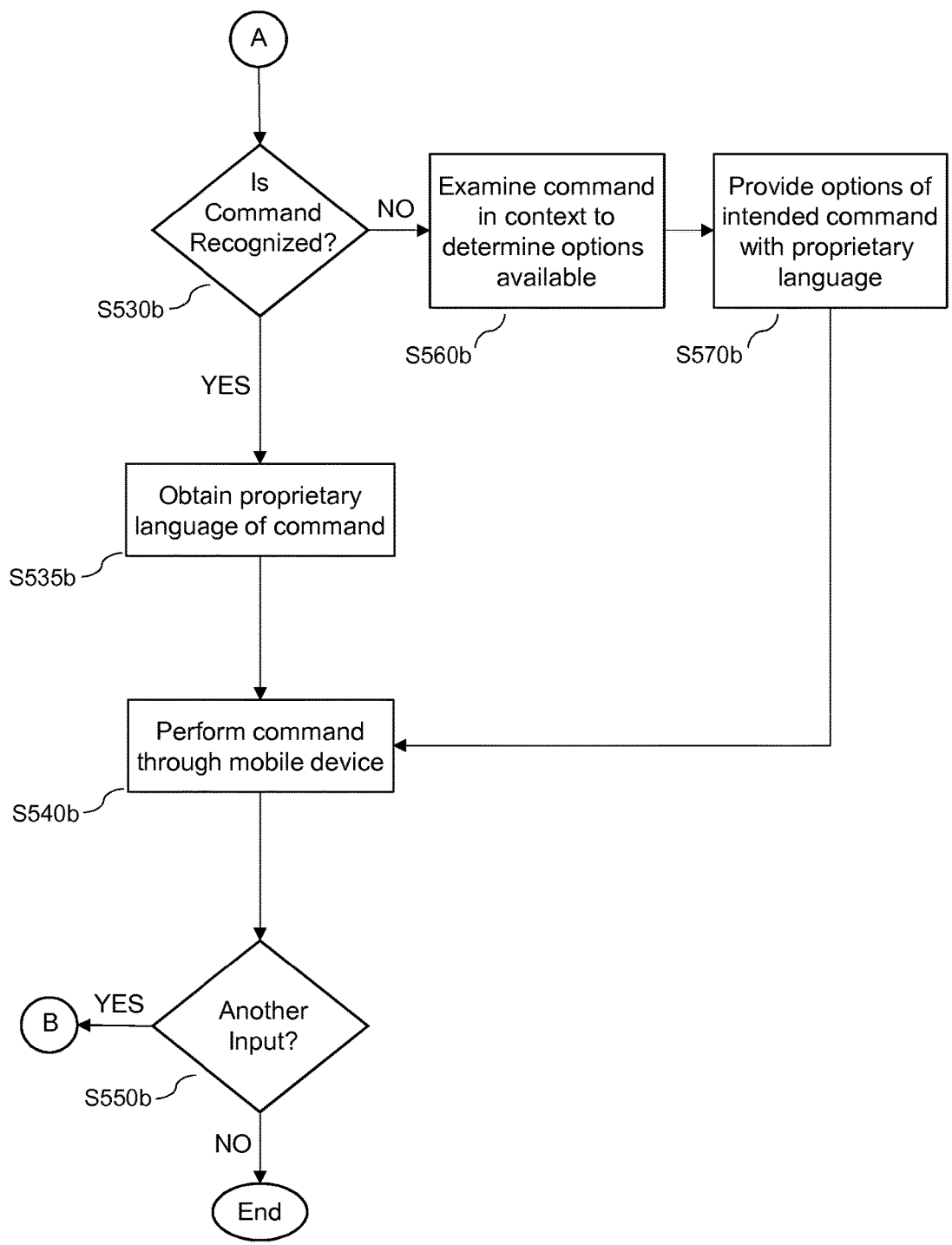

Alternatively, when it is determined that the virtual assistant system 10 is in a "local mode," (LOCAL at operation S520), the virtual assistant system 10 can perform the following sequence of operations as illustrated in FIG. 5B.

If the received command is recognized at the assistant server 200 (YES at operation S530b), the assistant server 200 can then obtain the proprietary language information of the specific device 300a or service 300b to be controlled, and provide the information to the assistant interface 110 of the mobile device 100 with the proprietary language included (operation S535b). With the necessary proprietary language required to perform the intended control obtained at the mobile device 100, control of the device 300a or service 300b can be directly performed at the mobile device 100 through the assistant interface 110 (and communicator 105) at operation S540b. Furthermore, if additional operations are requested to be performed at other devices or services using the information obtained as a result of the function performed at the previously intended device 300a or service 300b (YES at operation S550b), additional commands input at the mobile device 100 are received at operation S510 (FIG. 5A) to perform additional functions corresponding to the additional input commands. These additional commands input can include information obtained from the previous operations performed. For example, continuous communications between services such as "apps" often require information obtained from the previous "app" in which a function was performed (i.e., obtaining information on a movie playing in a user's locale).

If there exists confusion as to what input command may have been intended when the command is received (NO at operation S530b), the assistant server 200 then determines which possible options could have been intended by the command input at the mobile device 100 (operation S560b). Similarly to the description above with regard to operation S560a in FIG. 5A, this determination can be performed by examining the command in a number of contexts by considering, among other things, the historical usage pattern of this command, the particular user providing this command, the particular location in which the command is given, the specific time of day in which the command is given, whether this particular user providing the command always uses this specific gesture to perform a specific function at a specific device 300a or service 300b, etc.

Once the possible intended command options are determined at the assistant server 200 at operation S560b, the assistant server 200 can obtain the proprietary language of these commands with the corresponding plugins 220, and provide these command options back to the mobile device 100 (operation S570b) with their respective proprietary language information so that the options can be displayed at the user interface (UI) 150 of the mobile device 100. Here the actual intended command can be selected and performed directly at the mobile device 100 (operation S540b).

Similarly to operation S580a described above, the assistant server 200 may record the command option selected by the user in operation S570b so that the command will be recognized if it is input again later.

As noted above, FIG. 5A illustrates a remote mode according to an exemplary embodiment of the present general inventive concept. In the remote mode, the assistant interface 110 does not need to be on the same network or internet as the corresponding device 300a or service 300b, nor does the assistant interface 110 need to download the proprietary language of the device 300a or service 300b. In remote mode, the assistant interface 110 may be required to present credentials such as a username and password to prove the user has authorized access to the device 300a or service 300b, but communication usually occurs through the assistant server 200.

Conversely, in the local mode illustrated in FIG. 5B, communication occurs directly between the mobile device 100 and the device 300a or service 300b. In local mode, the assistant interface 110 does need to be on the same network as the corresponding device 300a or service 300b, specifically the corresponding local network (for example, Bluetooth or NFC). However, once the mobile device 100 is on this local network, credentials are not necessary to prove the user has authorized access to the device 300a or service 300b.

In another exemplary embodiment of the present general inventive concept, the virtual assistant system 10 may operate in remote mode while the assistant interface 110 communicates directly with the device 300a or service 300b. This is advantageous if the device 300a or service 300b monitors the number of access requests and shuts off access to IP addresses that are accessing it excessively. For example, if one million (give or take) users sharing one assistant server 200 want to access the same device 300a or service 300b through the assistant server 200, according to the control process illustrated in FIG. 5A, the device 300a or service 300b would register a large number of access requests coming from one IP address (the assistant server 200). The device 300a or service 300b may accordingly block access from the assistant server 200. In this situation, it would be preferable for each user to access the device 300a or service 300b through the assistant interfaces 110a-n of their respective mobile devices 100a-n. The device 300a or service 300b would then register one access request from each of a million different IP addresses, and therefore would not block access to any of the users.

Figure 6:
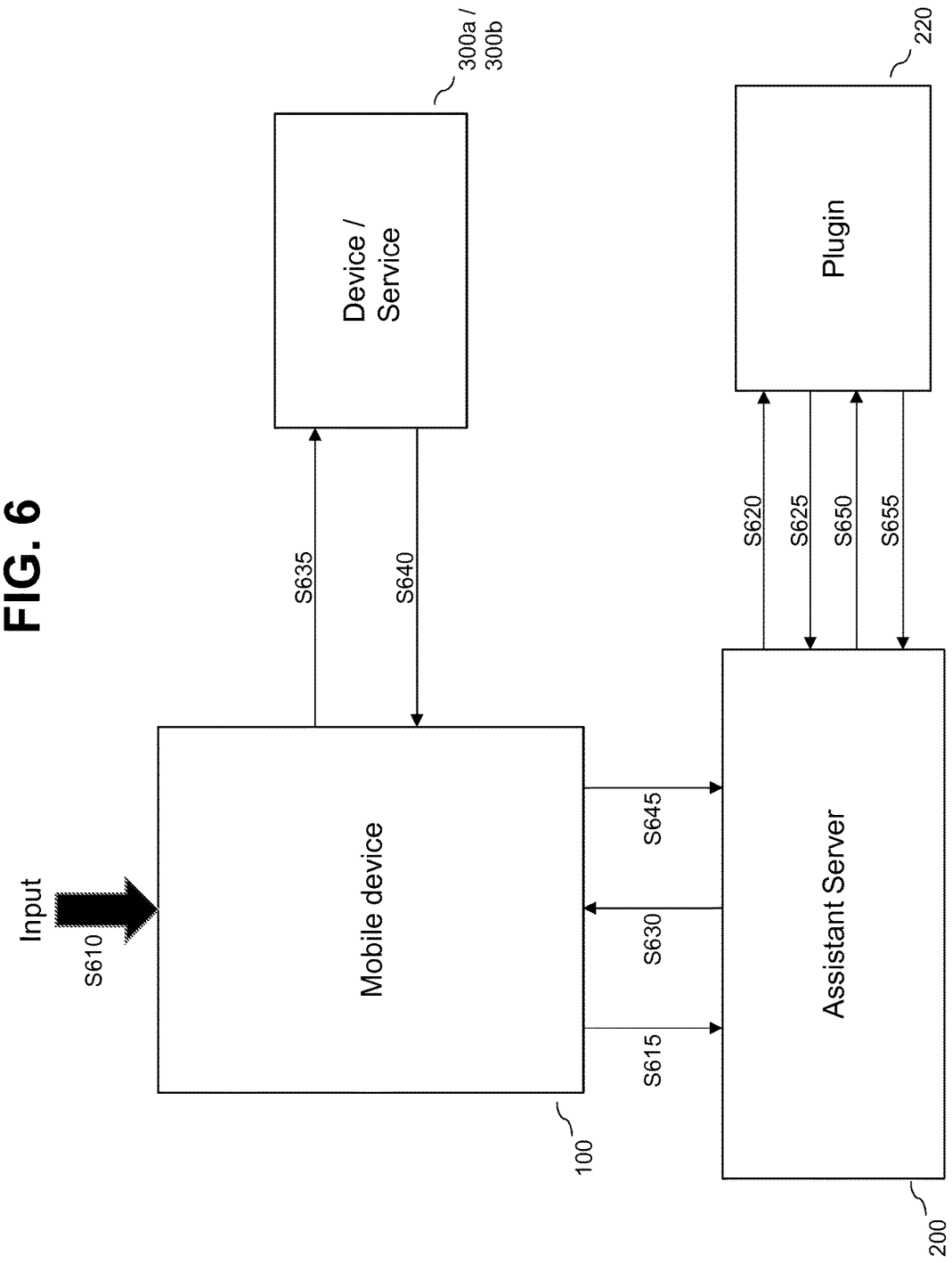
FIG. 6 is a block diagram illustrating the flow of operations of the virtual assistant system, according to an exemplary embodiment of the present general inventive concept.

The above exemplary embodiment of the present general inventive concept is illustrated in FIG. 6. In this exemplary embodiment, the virtual assistant system 10 is operating in remote mode. That is, the commands are being sent to a device 300a or service 300b that is not connected locally (through Bluetooth, NFC, etc.) to the mobile device 100. In the exemplary embodiment illustrated in FIG. 6, a user input is received at the mobile device 100 and translated into the semantic information interchange format language (operation S610). It is then transmitted to the assistant server 200 (operations S615), which in turn provides the translated input to the corresponding plugin 220 (operation S620). Here the plugin 220 converts this translated input to the appropriate proprietary language (operation S625).

After the input is converted to the proprietary language, the command is sent to the mobile device 100 (specifically to the assistant interface 110, through the communicator 105, illustrated in FIG. 2A) (operation S630). The mobile device 100 then transmits the converted command, in the corresponding proprietary language, to the device 300a or service 300b (operation S635). According to an exemplary embodiment of the present general inventive concept, the converted command may be transmitted by the assistant interface 110 through the communicator 105 over the Internet to the device 300a or service 300b.

The device 300a or service 300b carries out the corresponding action and transmits data back to the assistant interface 110 (operation S640). This data is in the proprietary language of the device 300a or service 300b, which the mobile device 100 on its own does not understand. The mobile device 100 accordingly sends the received data to the assistant server 200 (operation S645), which provides it to the corresponding plugin 220 (operation S650). The plugin 220 converts the data into the semantic information interchange format language (operation S655). Similarly to the remote mode illustrated in FIG. 5A, once the data is converted to the semantic information interchange format language, it may be shared between the mobile device 100 and other devices 300a and services 300b.

Furthermore, the present general inventive concept is not limited to only using one of the local or remote mode at a time. For example, the mobile device 100 could be connected locally to one or more devices 300a and services 300b, while also being connected through the assistant server 200 to a different device 300a or service 300b.

As described above, each plugin 220 created at the assistant server 200 for the specific external device 300a or service 300b is configured such that the plugin 220 can convert commands in the semantic information interchange format language into the corresponding proprietary language. Similarly, the plugin 220 can also convert this proprietary language and other information (i.e., credentials of the device or service) into the semantic information interchange format language used within the assistant server 200 so that the different external devices 300a1-n and services 300b1-n connected to the assistant server 200, via the Internet or other type of wireless communication used, as described above, can now share information between one another.

Furthermore, information obtained at the mobile device 100 from one device 300a or service 300b, as the result of an input command at the mobile device 100, can then be communicated and shared with other devices 300a or services 300b via the assistant server 200 so that a user of the mobile device 100 can communicate information with and between each of the devices 300a and/or services 300b. In other words, the mobile device 100 can control each of the devices 300a and/or services 300b and interact (share information) between the devices 300a and/or services 300b to obtain a greater or more substantive bundle of information, which is all transported in the semantic information interchange language format. This newly obtained substantive bundle of information can then be used with another command to be directed to another device 300a or service 300b or shared with other mobile devices 100a-n connected with the assistant server 200. This process can continue between external devices 300a and services 300b and the mobile device 100 as well as between mobile devices 100a-n connected with the assistant server 200 to share and obtain any information desired, and consequently to use this information to access any additional external device 300a or service 300b for an ultimate result sought.

An example of gathering information between services 300b, for example, can be a case where a user of a mobile device 100 accesses a service 300b Fandango™ to determine which movies may be available in a given location, and then choose a specific movie desired to view. Before the user purchases tickets to this movie, the user can transmit this movie information (translated into the semantic information interchange format language by the assistant interface 110) to another service, such as IMBD™. Then the user can determine which actors are in the movie via the IMDB™ app prior to purchasing the tickets through Fandango™, based on whether the user may desire to watch a specific movie if the movie includes this particular actor.

In other words, once a movie is selected within the Fandango™ app, the assistant interface 110 can convert this movie information into the semantic information interchange format language, where this translated movie information can then be shared with other apps such as IMDB™ through the IMDB™ plugin in order to obtain additional information about the movie. Such additional information to be obtained can include, for example, which actors are playing in the movie. IMDB™ can receive and understand the movie selected within the Fandango™ app because this information is converted into the semantic information interchange format language from the Fandango™ proprietary language, and then can be converted into the proprietary language of IMDB™ by its corresponding plugin 220.

Furthermore, prior to purchasing the tickets, the user at the mobile device 100 may share this obtained movie information with other users at other mobile devices 100a-n which are also connected with the assistant server 200 (to be described in more detail with respect to FIG. 1A). Then the other users may view the obtained movie information and agree to a certain number of tickets to be purchased, and also may ultimately choose another movie via the same process, at which point all users can agree to purchase tickets for a movie which all users have agreed upon after sharing all of this information gathered between Fandango™ and IMDB™, etc., and between the users of the connected mobile devices 100a-n themselves. The above example is only an example of shared communication between users and services 300b, and is not limited thereto. Any number of communications and any format of communications between services 300b and users (via mobile devices 100a-n) can be performed through the semantic information interchange format language created within the assistant server 200.

Another example of gathering information between services 300b can be related to music. For example, the mobile device 100 can use apps such as Gracenote™, Shazam™, or any other type of music recognition software to recognize music that is playing somewhere (such as a restaurant, shopping mall, music store, radio, television, etc.). The music recognition can be performed by a microphone type sensor within the mobile device 100 or connected to the mobile device 100. The song recognized by the assistant interface 110 can then be converted into the semantic information interchange format language and sent to the assistant server 200 to present this information at the Gracenote™ app through a Gracenote-created plugin 220. Gracenote™ can then provide the song information to the Gracenote™ plugin 220, which in turn will provide the song information in the semantic information interchange language format to be used for any additional purpose that may be requested by the user at the mobile device 100.

In other words, at this point any additional service 300b that knows and/or understands how to use a song and is connected to the assistant server 200 can use this music information (in the semantic language format) to provide any desired result, as may be requested by the user at the mobile device 100. For example, this information can be sent, via the same process, to the app MusixMatch™, which presents the lyrics for the song. It can also be sent to Rdio™, which adds the song into the Rdio™ queue for the user. It can also be sent to Sonos™ speakers, which play the song. It can be also sent to YouTube™, which can find a video of the song and play this video or add the video to the user's playlist on YouTube™. The number of apps that this obtained and expanded information can be sent to in order to perform a command or gather even more information is only limited to the number of apps or other services that can work with perform some type of function using this obtained music information.

In each case, the plugin 220 for each service 300b desired to be used with this obtained music information can translate to-and-from the semantic information interchange language format and the proprietary language of the service 300b, thus providing for the free flow of communication regarding the music information between all devices 300a and/or services 300b, as well as between multiple users. Furthermore, the music information provided in the semantic information interchange language format can be sent from one user at a mobile device 100 to other users of other mobile devices 100a-n to allow multiple users to apply this music information to various services 300b and devices 300a of their choosing.

In addition to the above described capabilities, if a song is playing on a television, for example, and a user of a mobile device 100 desires to capture, save and play the song on an external portable MP3 player or other type of music playing device at a later time, the user can first use Gracenote™ to recognize the song playing on the television. Subsequently, this song can be translated to the semantic information interchange language format by the assistant interface 110 and provided to the assistant server 200, where the translated song can then be sent to a plugin 220 created for the external portable MP3 player, where the translated song information can be translated to the proprietary language of the external portable MP3 player, where the external portable MP3 player can then be instructed by either the plugin 220 itself or the mobile device 100 to play the song at the user's convenience. Whether the plugin 220 is instructed to directly play the song on the external portable MP3 player or whether the plugin 220 provides the proprietary language and other necessary information back to the assistant interface 110 so that the mobile device 100 can play the song on the external portable MP3 player can depend on either the network in which the MP3 player is connected, the location of the MP3 player with respect to the mobile device 100, or in accordance with other conditions as described previously herein.

Figure 7:
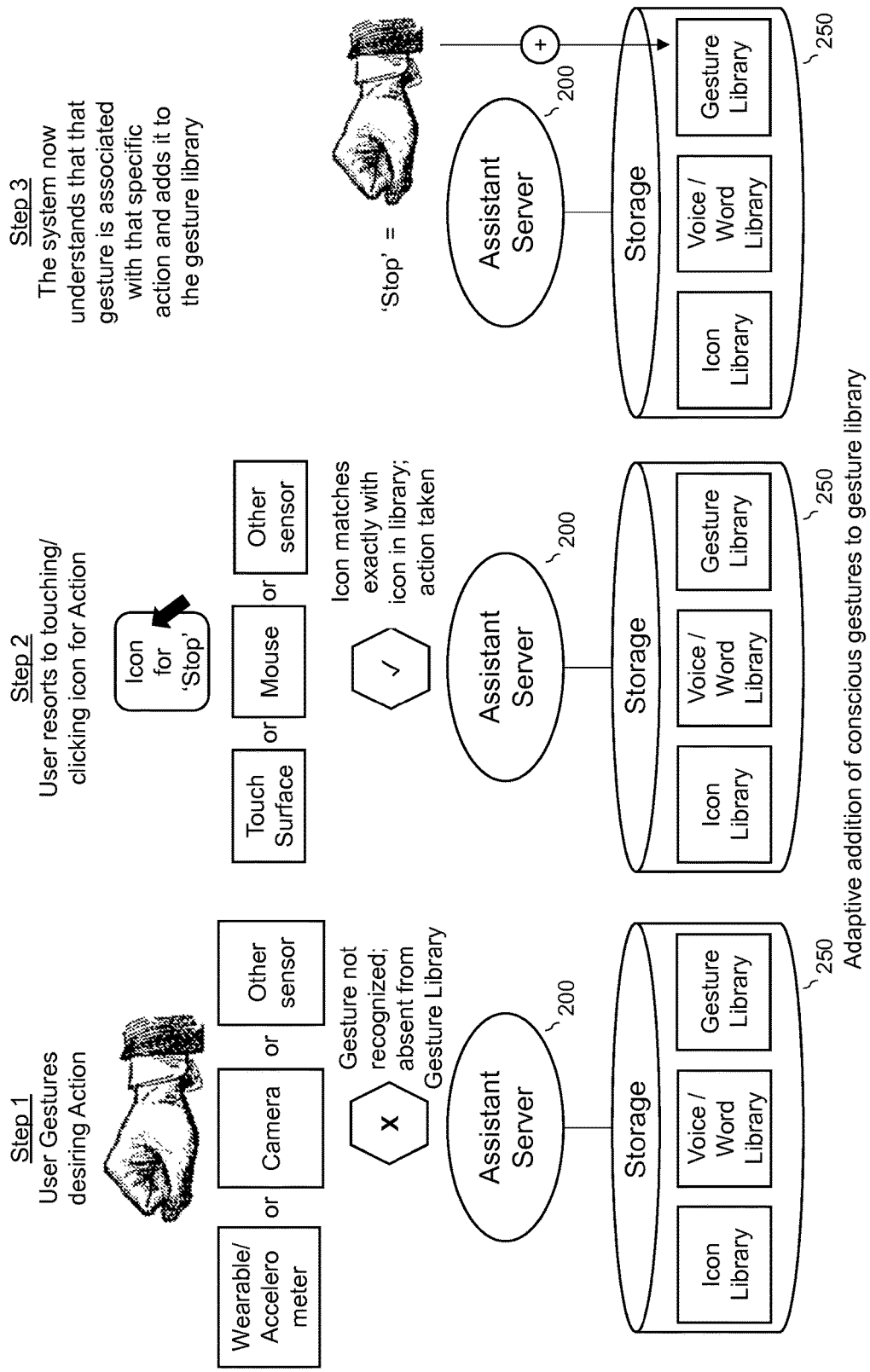
FIG. 7 illustrates a process of adaptive addition of a conscious input command to a library of commands, according to an exemplary embodiment of the present general inventive concept.

In addition to providing a common set of commands, exemplary embodiments of the present general inventive concept also allow new commands to be developed, via an adaptive control system. For example, a command received at the mobile device 100 which is not recognized may be recorded as a new command once defined by the user. As illustrated, for example, in FIG. 7, a user may make a gesture intended to give a command ("Stop", as illustrated in FIG. 7). If this input is not among the inputs recorded in the assistant server 200, the user may then input the command a different way, for example by touching an icon denoting "Stop." The assistant server 200 may then record the first input (the gesture in this example) into the storage 250 as denoting the associated command.

Figure 8:
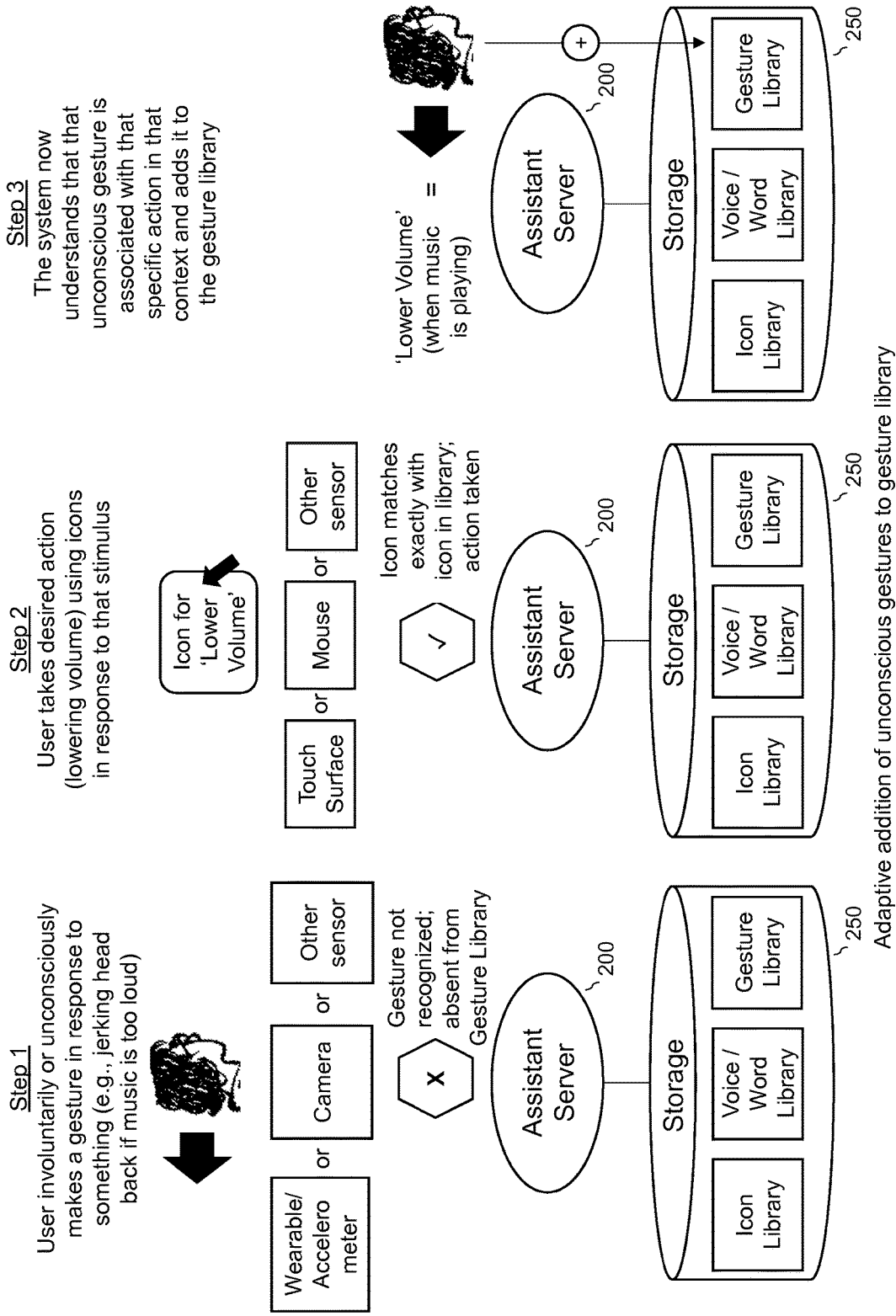
FIG. 8 illustrates a process of adaptive additions of unconscious input commands to a library of commands, according to an exemplary embodiment of the present general inventive concept.

According to an exemplary embodiment of the present general inventive concept as illustrated in FIG. 8, natural and involuntary inputs can also be interpreted as commands by the virtual assistant system 10. For example, if a user of the virtual assistant system 10 plays a video and the audio is too loud, the user may involuntarily flinch and jerk his/her head back. This involuntary motion will be followed by the use of icons or gestures or voice commands to lower the volume. The virtual assistant system 10 may thereby learn that the flinch and head-jerk-back gesture should be associated with lowering the volume by a large amount or muting it altogether. This new command (flinch and head-jerk-back) may be accordingly saved in the storage 250 of the assistant server 200. Similarly a grimace or other facial expression in certain contexts could be associated with 'undo or reverse the last command'. Accordingly, the virtual assistant system 10 can adapt to and store unconscious or involuntary input commands in addition to conscious input commands.

As an alternative, or in addition to the above exemplary embodiment of the present general inventive concept, a user or a developer could specify specific gestures which represent specific people. As an especially contrived example, snapping one's fingers, tapping ones forehead and then gesturing to indicate a clockwise movement followed by two palms open to indicate '10' might mean "send my mother a message that I will be there in 10 minutes." Hence, some inputs may have a range of variance that represent specific things like numbers or individuals.

Some variance may also be provided in the inputs, such as the icons and gestures, themselves. Therefore, several icons may be specified in the library which are mutually interchangeable and equivalent. Similarly, several gestures could correspond to the same underlying meaning and be interchangeably used. This is important because different cultural zones may have varying meanings associated with specific things and have preferences which are varying. Note that the color and size of icons could also have meaning associated with them. Similarly, icons and gestures could take on additional meaning when used in conjunction with one another, such as denoting which device 300a or service 300b is being controlled. For example, an icon representing 'close' could be used to manipulate a door closed when the right palm is held flat out but be used to close a window screen when a U shape is made with right hand instead. Such rules would also constitute a part of how the library is predefined and then used by plugin developers to provide users with controls. Note that gesture repetition may also carry meaning. Making one knocking action with a finger versus two knocks in rapid succession could be entirely different gestures in the gesture library. As another example, for a plugin developer who is connecting the assistant to a document management system, pinching fingers (as though holding an imaginary key) and turning once might mean make a document 'read only' whereas turning it twice could mean 'remove both read and write access.'

Figure 9:
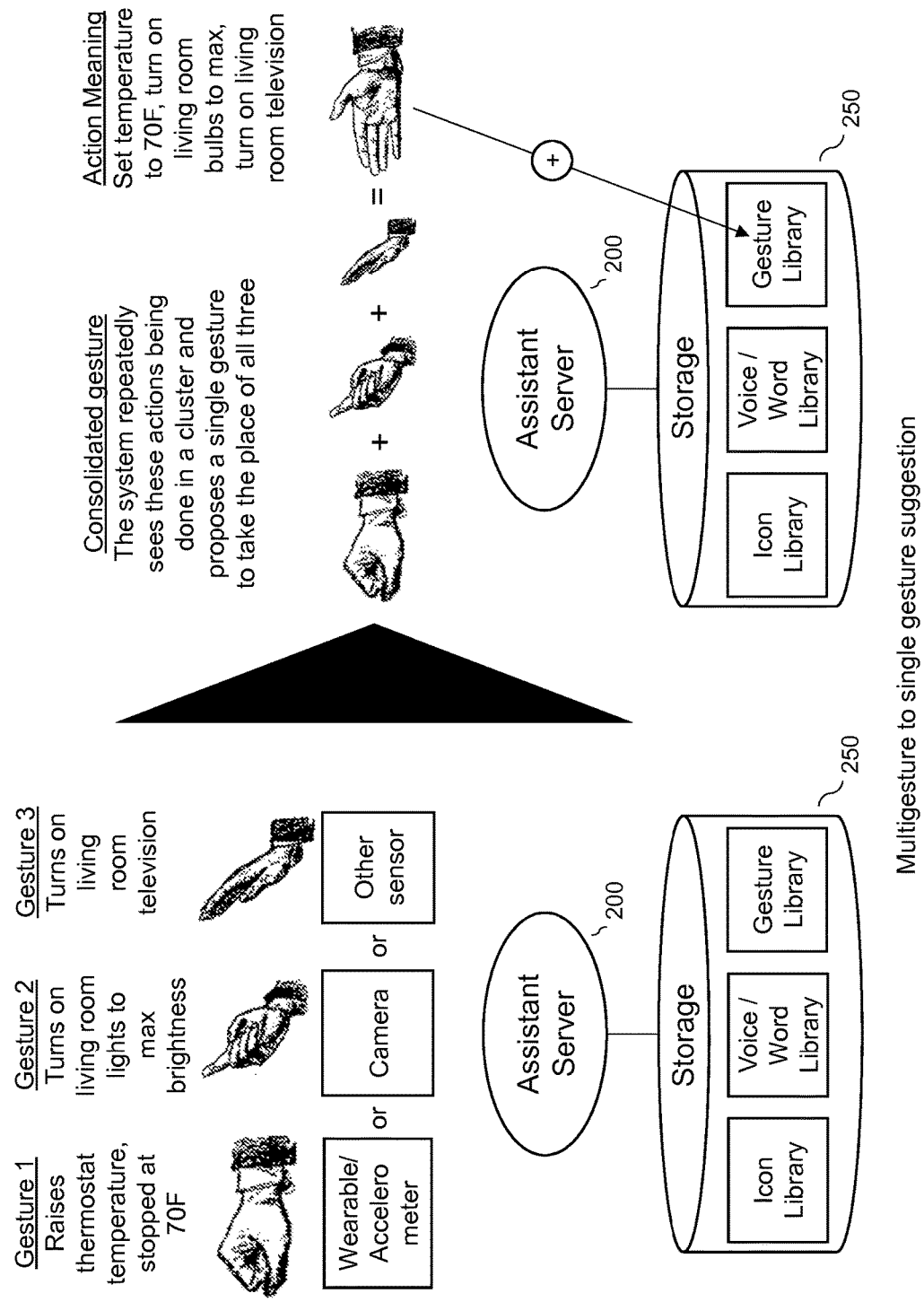
FIG. 9 illustrates a process of consolidating a plurality of gesture inputs in a gesture library to a single gesture input, according to an exemplary embodiment of the present general inventive concept.

Another example of such adaptive use according to an exemplary embodiment of the present general inventive concept is illustrated in FIG. 9. As described above with respect to FIG. 2A, the mobile device 100 may include a Central Processing Unit (CPU) 130. This CPU 130 may be configured to run a learning algorithm which determines when a series of commands are customarily given together. For example, a user may make a first command, illustrated as a gesture, to raise a thermostat temperature to 70° F. The user may then make another gesture to turn on living room lights to maximum brightness, and a third gesture to turn on the living room television. If the CPU 130, running the learning algorithm, determines that these gestures are customarily performed together, it may communicate this determination to the assistant server 200, which in turn may generate a new command which executes all three actions simultaneously. FIG. 9 illustrates is the group of commands customarily presented together as a separate new gesture. In other exemplary embodiments of the present general inventive concept, multiple equivalent gestures may be proposed, any one of which will execute all the associated actions. When one of these gestures is detected at the mobile device 100, it is translated into semantic information interchange format language by the assistant interface 110 and transmitted to the assistant server 200, where it is then translated through the plugins 220 to give the appropriate command to the corresponding devices 300a1-n and/or services 300b1-n.

In other exemplary embodiments of the present general inventive concept, the virtual assistant system 10, specifically the mobile device 100, may determine that specific icons customarily receive touch inputs at a specific time of day, and then bring these specific icons to more prominent positions on the user interface at that time of day. The virtual assistant system 10 may also present these icons (for example, as a visual depiction) on the user interface 150 of the mobile device 100 in more prominent positions compared to other icons at that time of day. The virtual assistant system 10 may alternatively generate a new icon at the assistant server 200 and displayed on the mobile device 100 which executes the actions of several icons customarily receiving touch inputs together. These correlations are saved—in human readable or non-readable format—in the storage 250 attached to the assistant server 200. The virtual assistant system 10 will generate a name for this icon based on the context. For example, an icon could be named 'arrived home'.

The virtual assistant system 10 may be adaptive in another respect. If, via the CPU 130 running the learning algorithm, the mobile device 100 notices that the user incorrectly but repeatedly uses an icon or sequence of icons with the intention of executing an action which fails to be executed (because the icons were incorrect) then the assistant server 200 may actually associate that icon or icon-sequence with that action (for that user, for a subset of users, or for all users). For example, if a user repeatedly tends to turn up the volume and then immediately turns it back down and then (using a different icon) moves up a channel of a television, this indicates that the user is confusing the icon for turning up the volume with channel-up. The CPU 130 in the mobile device 100 can detect this behavior and then propose that the "volume-up" icon be used for "channel-up" instead and in turn be replaced with a different and less-confusing icon. The virtual assistant system 10 can also automatically make the change if it deems it appropriate based on a decision-making algorithm that is running in the CPU 130, the assistant server platform 210, or on a separate server whose results are saved on the storage unit 140 or storage 250.

These usage patterns and the accompanying changes may be collected in the storage unit 140 of the mobile device 100 or in the storage 250 of the assistant server 200 to be used as updated commands. As a result, the library of commands 230 stored on the storage 250 may expand over time with new, intuitive and adaptive commands.

Alternatively, or in addition to the above adaptive control in which the assistant server 200 automatically updates the commands, data on the user's actions and inputs may be collected and made available to the plugin developer, for example, by e-mail or an online administrative portal through which the developer can view information related to the usage of the plugin 220. This allows the developer to update the plugin 220 accordingly. This is valuable because the repeated use of the inputs, for example icons, indicates a persistent intuitive mapping of them and the intended action in the mind of that user or in an aggregate group of users. The developer can discover that such a psychological input-to-action mapping exists based on user behavior. Separately transmitting the data to the developer instead of implementing a learning algorithm in a CPU can be advantageous when processor capacity or the effectiveness of a particular learning algorithm is a concern.

These adaptive techniques may be employed to address semantic confusion between plugins 220 created by different plugin developers. For example, the developer of the plugin 220 for one thermostat may specify one gesture to raise temperature whereas the developer of the plugin for a different thermostat may specify a different one. Based on how users are employing gestures, the virtual assistant system 10 may provide suggestions to the developer on how gestures (or icons or voice commands) can be modified to allow users to accomplish what they want with a more consistent set of gestures. By classifying services into similar groups, developers will also be helped to select the most intuitive icons, gestures and voice commands for their new plugins 220. For example, a developer creating the plugin 220 for the tenth thermostat to interface with the virtual assistant system 10 may be able to be better informed by how users actually prefer to invoke various thermostat functions by means of icons, gestures and voice with the previous nine thermostats. This could be done prescriptively by strongly suggesting the developer use specific icons for specific functions or more indirectly by discouraging mappings which have been shown to be confusing for users in the past.

Furthermore, these adaptive techniques can be employed using various artificial intelligence techniques, which are to be utilized by and/or developed on various types of hardware, including robotics algorithms, learning algorithms, parallel programming, logical searching, optimization, heuristics, evolutionary computation, etc., but are not limited thereto. Accordingly, the virtual assistant system 10 can "learn" a user's preferences based on the user's movements, habits, and tendencies.

According to another exemplary embodiment of the present general inventive concept, different sets of gestures, icons and voiced commands can become established for different groups of users (e.g. in different countries). The virtual assistant system 10 (either the CPU 130 of the mobile device 100 or the assistant server platform 210 of the assistant server 200) can infer from the use of specific inputs (gestures, voice commands, icons, etc.) which of these groups the user belongs to and then provide support to them in the "dialects" that user is most familiar with. For example, it is possible that people coming from military contexts get used to a different set of icons or gestures to mean "turn left" than people coming from civilian contexts. If the virtual assistant system 10 is able to infer that someone is military-affiliated based on a gesture the person makes to indicate "turn left," other gestures and icons may also change meaning to provide this person with a more familiar context. Such inferences can then be saved in the virtual assistant system 10 as a context of this person (specifically, in the storage unit 140 of the mobile device 100 and/or the storage 250 of the assistant server 200).

According to another exemplary embodiment of the present general inventive concept, there may be a three tier system of libraries. The first set of (gesture, voice, icon) libraries are universal and apply to all users. The second set of (gesture, voice, icon) libraries apply to specific cohorts of users (e.g. those in a specific trade, those of a certain age or social grouping, those who speak a given language, those who are members of a specific set of institutions, those who reside in specific regions or countries, etc.). The third set of (gesture, voice, icon) libraries apply to specific users. If there is conflict between these because the same words, gestures or icons mean different things in these three different tiers of libraries, a precedence rule can be utilized. Normally, user-specific interpretations trump user-cohort interpretations which in turn trump universal interpretations. However, this precedence order can be different in some situations.

Figure 10:
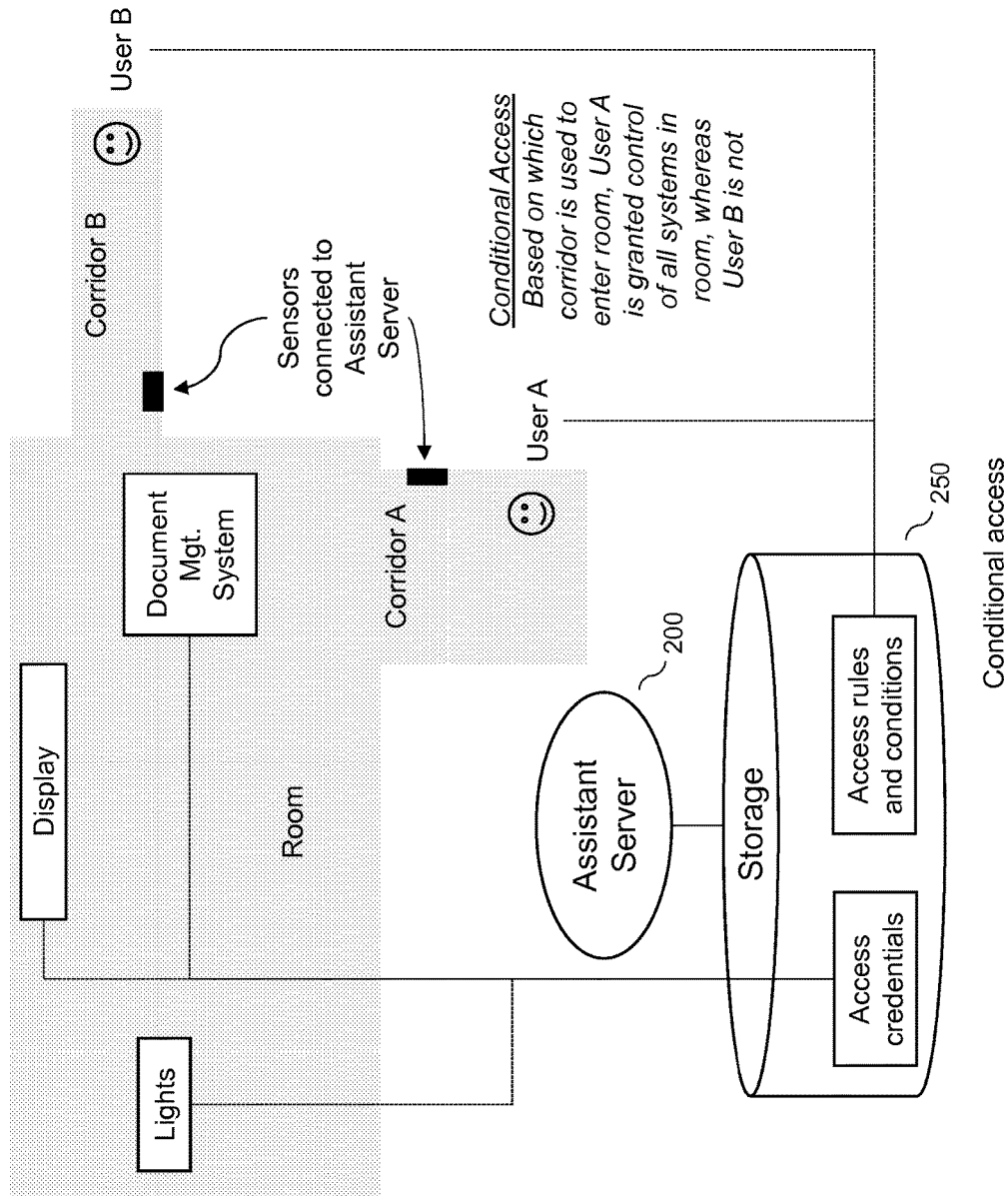
FIG. 10 is a diagram illustrating conditional access to the virtual assistant system, according to an exemplary embodiment of the present general inventive concept.

Controls may also be automated or vary depending on context. For example, if the user always turns on the DVR after turning on the TV, the virtual assistant system 10 can automatically choose to turn on the TV when receiving a command to turn on the DVR. Alternatively, this predictive behavior may be programmed by the plugin developers according to use or context data gathered by the virtual assistant system 10. As another example, access to a certain document management system can automatically be enabled if a user is present in a particular geo-fenced area, and such access may be cut off when the user exits that area. Control can be made even more specific, e.g., as illustrated in FIG. 10, a user that enters a room through one corridor they might have access to the document management system, whereas if the same user enters from a different corridor that user may not have access. Other factors, for example, time or the sequence of user usages of the virtual assistant system 10 can also be an element of context, thereby varying the controls of the virtual assistant system 10.

In order to enable these scenarios where the virtual assistant system 10 takes predictive action, according to an exemplary embodiment of the present general inventive concept of the virtual assistant system 10, the mobile device 100 or the assistant server 200 can constantly measure when certain actions are invoked and collect these measurements in its storage (storage unit 140 of the mobile device 100 and/or the storage 250 of the assistant server 200). The measurements could include locations, times of day, co-presence of specific individuals, action sequences that have been taken and other factors. If the virtual assistant system 10 finds a reliable way to predict when certain actions are taken based on statistical, probabilistic or machine-learning algorithms that are running on the CPU 130, the assistant server platform 210, or on servers or other learning type devices connected to or in communication with the virtual assistant system 10, then the virtual assistant system 10 can do so.

The virtual assistant system 10 can also proactively present its intention to predicatively take such actions to the end user by means of displaying a message on the mobile device 100. This message can be transmitted from the assistant server 200 to the mobile device 100 to be displayed on the UI 150, or the message can be generated at the CPU 130 and displayed at the UI 150. The message may be visual, audible, or tactile, and allow the user to approve or disapprove such actions. The message can take the form of presenting the predictive action in advance as a new "standing rule" or proposing that the virtual assistant system 10 take the action momentarily unless the user overrides the proposal and instructs the virtual assistant system 10 not to.

As will now be described in more detail while referring to FIG. 1A and FIG. 11, a user of the mobile device 100 may share access to the assistant server 200 (hence the virtual assistant system 10) to allow other users to control devices 300a and services 300b within the virtual assistant system 10 and therefore already being controlled by the user sharing the access. Thus, a user (at mobile device 100) can share the semantic information interchange format language with other users through the other users' respective mobile devices 100a-n. Accordingly, any desired control of a device 300a or service 300b by the user of the mobile device 100 can be shared with another user through the other user's mobile device 100a (see dotted lines "sharing access") by "friending" the other user's mobile device 100a, as illustrated in FIG. 1A. This sharing (or "friending") of access to control devices 300a and services 300b can be provided once the user (mobile device 100) has a way of contacting the other user, for example, via email, LinkedIn™, Facebook™, Twitter™, etc. In other words, once a user of the mobile device 100 within the virtual assistant system 10 is able to communicate with another user via another user's mobile device 100a-n through any form of communication, the user (mobile device 100) can send an "offer" to share access to the assistant server 200 with the other users' mobile devices 100a-n via this form of communication.

Once the other user(s) accepts the offer of access to the user's assistant server 200, the other user(s) may be provided with the same control over all external devices 300a and services 300b as the user of the mobile device 100 possesses through the assistant server 200. Moreover, as described in more detail below, the shared access with other users may be limited in many aspects, such as, for example, with respect to the level of control, the location in which the other user(s) is situated, a time frame in which the user allows other user(s) to maintain the shared access, etc. There are a vast number of ways in which access sharing to other users may be controlled/limited based on the desired setup of the virtual assistant system 10 by either the developer of the system 10 or the user's instructions at a later time after the original setup of the system 10.

The shared access allows the other users to control external devices 300a and services 300b through the original user's assistant server 200 and to the level at which the original user allows the shared (or "friended") user to have access.

Figure 11:
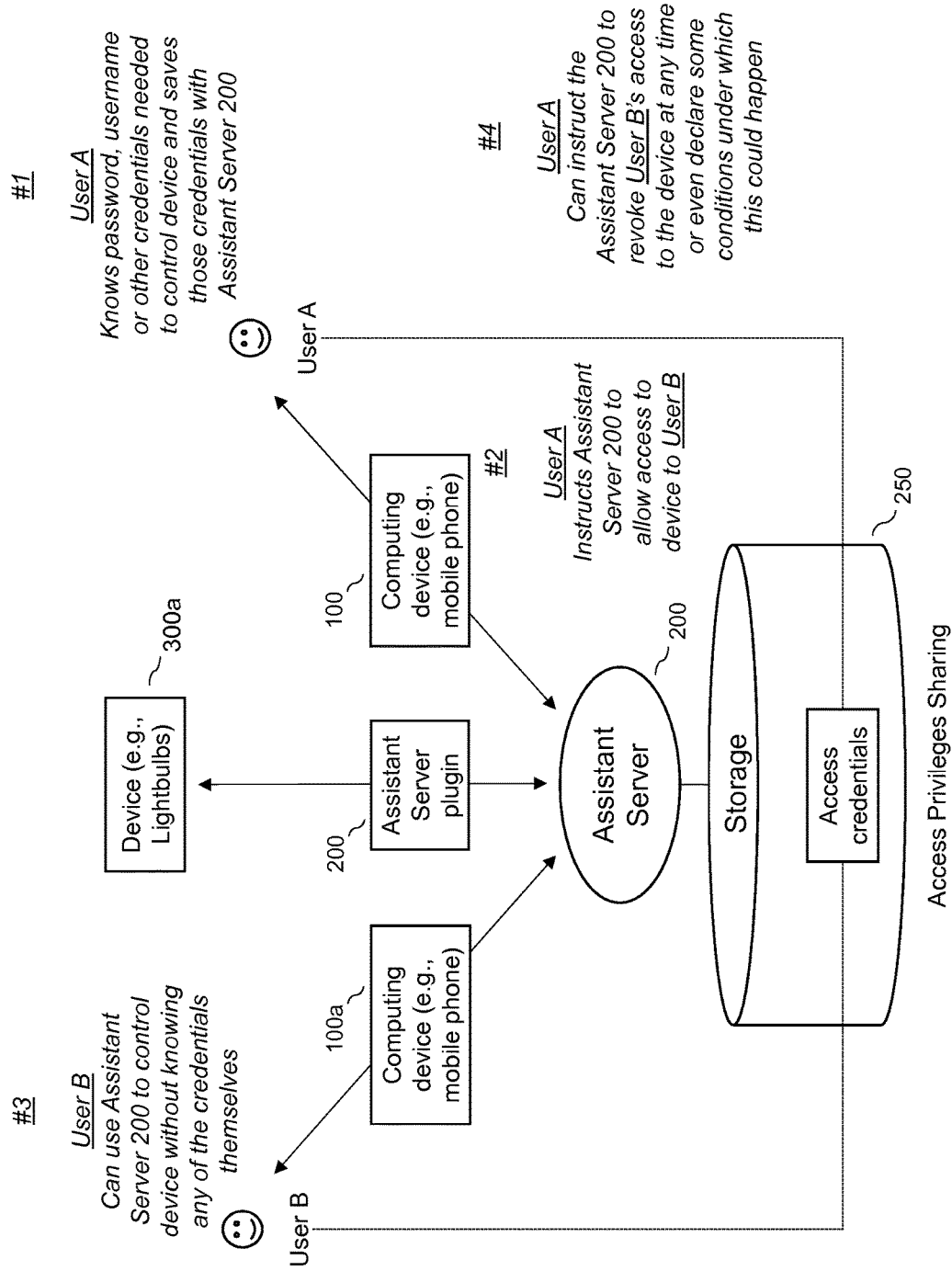
FIG. 11 is a diagram illustrating access privilege sharing of the virtual assistant system, according to an exemplary embodiment of the present general inventive concept.

Furthermore, as illustrated in FIG. 11, at #1, although the original user A (the user making the offer) must initially provide a username/security ID and password (or "access credentials") in order to access an external device 300a or service 300b, the user(s) B who becomes "friended" (receive shared access) does not need to enter this security ID or password. Therefore the original user A is never required to share these access credentials with the other user(s) B being "friended." Accordingly, when user A instructs the assistant server 200 to allow access to a device 300a or service 300b (see #2 of FIG. 11), the user B receiving the shared access can then control the device 300a without knowing the access credentials input by user A, as pointed out at #3 of FIG. 11. Thus, no access credentials need to be exposed or shared with any other users in order to "friend" another user(s) and allow the other user(s) to have a full or limited access to any device 300a or service 300b, or even the assistant server 200. Furthermore, the original user A can instruct the assistant server 200 to revoke user B's access to the device 300a or service 300b at any time, or alternatively can declare specific conditions under which revocation of access to other users, i.e., user B, can occur.

In addition to keeping the ID and password (or other credentials) confidential from other users, since the ID and password remain only at the assistant server 200, and therefore never need to be communicated wirelessly, the user's IDs and passwords (or other credentials) can safely remain confidential to the original user A (at mobile device 100). Accordingly, illegal access, impermissible access and misuse of such credentials via a wireless transmission interception or other type of compromised security can be entirely prevented.

Thus, the assistant server 200 maintains all credentials (ID, passwords, etc.) that give authority to access and use the underlying services 300b or devices 300a. These credentials are maintained by the assistant server 200 at the storage 250 that is connected either directly or indirectly to the assistant server 200. When a plugin 220 is created at the assistant server 200, and a user begins to access this plugin 220 for the first time in order to have the assistant server 200 carry out various actions with the corresponding service 300b, the user first needs to provide the required credentials for the service 300b to the assistant server 200 in some form. These credentials can be collected by the assistant server 200 in one of many means: through a screen, keyboard, scanner, mouse, camera, microphone or hand-held or wearable device (such as armband or facewear or fingerwear, etc.) or another peripheral hardware system or systems connected to or in communication with the assistant server 200.

As an example, the user A (at mobile device 100) may provide a username and password for an email service to the assistant server 200. Now the assistant server 200 becomes capable of accessing and using the service via the Internet, Bluetooth, Optical or visual signaling, audio signaling (through an audio speaker or other mechanism), tactile or other mechanical signaling using a device such as a vibration unit, WiFi, USB, FireWire, HDMI or through other means on the user's behalf. The user can now instruct the assistant server 200 to share access to the service 300b with another user(s) B as well. As described above, this instruction by user A enables another user(s) B to access the service 300b via the assistant server 200, and only through the assistant server 200. As far as the underlying service 300b (i.e., email) is concerned, it is being accessed by the original user (user A) either through the assistant server 200 or through the mobile device 100 if the assistant server 200 and the mobile device 100 are provided together in one hardware, and only the assistant server 200 is aware that the service 300b (or device 300a) is, in fact, being accessed by another user (user B).

Another example of this secured form of sharing is described as follows, while still referring to FIG. 11: the original user A establishes a device 300a in the assistant server 200 using the assistant interface 110, e.g., the original user A may establish a certain set of lights as an external device 300a to be accessed and controlled wirelessly. The user may then provide the assistant server 200 necessary information required to access and operate the lights. This information could include, for example, a password, username, and an IP address of the lights. The plugin engineer initially specifies which credentials are needed for a user to start using that type of external device 300a with the assistant server 200. Now the lights exist as the external device 300a in which the assistant server 200 can access. This access control is owned only by that user A. This user A can now instruct the assistant server 200 to "friend" those lights (device 300a) to any other user B as desired. This sharing of access can be accomplished in various different ways as described herein. For example, user A may instruct the assistant server 200 the share access by contacting user B and offering user B to join the virtual assistant system 10, or can make a gesture toward the user B if user B is within an area in which a gesture can signal user B, or user A can make a gesture that signifies allowing access, at which point a camera detects a user B in the vicinity, etc. The other user(s) B can now see the external device 300a via the assistant server 200 and use the external device 300a. The other user B can, for example, turn these lights on and off, and change the color of these lights. However, as described above, this other user B does not possess the username, password or IP address (or other credentials as originally created by the engineer) of the lights and has no means of operating the external device 300a except through the assistant server 200.

At any time the owner user A can instruct the assistant server 200 to "unfriend" the friended user B (revoke access) from the external device 300a. If the owner user A revokes access to the other user(s) B, the other user(s) B ceases to be able to operate the lights or, in some cases, user B may even be blocked from being able to see these lights in any fashion at all.

A user may also set criteria by which "unfriending" occurs automatically. Such criteria can be a time limit of access shared with user B, a location condition placed on user B, and so on. For example, services may be shared with the other user B for a preset amount of time, or until the other user leaves a particular area.

There are an extensive number of other applications that can be implemented by the virtual assistant system 10. Controlling a set of home devices 300a are one obvious application. If someone visits a user's home, the host can instruct the virtual assistant system 10 to give them courtesy access to all or a large subset of the connected devices 300a (and/or services 300b) in the user's home (lights, thermostat, window blinds, alarm system, phone system, WiFi hub, entertainment systems, etc.) as long as the users being "friended" are within the physical confines of the home. This could also be done based on calendar invites. In other words, along with inviting others to a user's home, the user A owning the home could also create a formal invite to the users to be "friended" which specifies access to home facilities during the time of the visit.

This limited access sharing can also be implemented in a business context. When someone joins a team, the virtual assistant system 10 can extend access to various tools and services to this person via the assistant server 200. When this person ceases being part of the team, this access can be revoked. This revocation can be performed by simply requesting a list of those members provided with access, and then selecting among certain members in which the user A requests access to be revoked.

The assistant server 200 can also provide this access based on payments being made. For example, a visitor to a movie theater can have access to a soda fountain via the theater's assistant server 200 for as long as a movie is playing. This time based access sharing can be automatically revoked at any designated time, i.e., at completion of the movie.

As another example, a user A (of mobile device 100) can share information from all his/her health devices with his/her doctor. The doctor, being user B, can be provided access to all health information stored in the storage 250 of the assistant server 200.

As described above, the shared access offered by the initiating user A of the mobile device 100 to other users B can be completely controlled by the user A of the initiating mobile device 100 such that access by any of the shared access users B can be terminated at any time by the owner user A, as well as being limited to a certain level of control, a certain time period of control, control limited to within a certain area/location, etc.

Sharing can also be predictive in nature, where the predictive rules and algorithms may or may not be humanly readable, and are saved in a storage 250 connected to or in communication with the assistant server 200, where they are running. Alternatively, as pointed out above, under certain situations the predictive rules and algorithms related to the access sharing can be running on the mobile device 100, and therefore stored in the storage unit 140. For example, if a certain set of contexts usually result in a user A sharing access to some services with another user B, the assistant server 200 may recognize this contextual pattern and in the future perform this sharing automatically. The assistant server 200 may also present the owner user A with the choice as to whether the contextual pattern should be determined and applied automatically, or whether the user A should make this decision. For example, the assistant server 200 can alert the user A that the assistant server 200 intends to share access to the lights or other devices 300a (or services 300b) based on a recognized contextual historic pattern, such as sharing a thermostat control, a television, etc., with a guest user B unless the user A explicitly wants to refuse such access. At this point the user A can select an option provided by the assistant server 200 by touching an icon on the display 150, making a gesture to a sensor 160 within the mobile device 100, and provide an input command via another form of input as described herein.

As pointed out above, sharing is also possible to perform at varying levels. For example, an online commerce service like Amazon™ has multiple things one can do with it. Ratings and pricing of various items can be reviewed in a personalized way ("this is the rating for other readers like you" or "as a prime member, you don't pay for shipping for this item"), items can be added to a wish list, items can be added to the Amazon™ shopping cart and purchases can be made. It is possible to create subset services where items can be reviewed and placed in the Amazon™ shopping cart but purchases cannot be completed. It is possible to see how a parent (user A) can provide their children (user B) with sharing an Amazon™ account to the extent of putting things in the Amazon™ shopping cart but not actually making the purchase. This way the parent (user A) can review all items the children (user B) want before the purchase is made. In other words, access sharing can apply to even subsets of a plugin's functionality rather than all of its functionality. Similarly, other rules can also be crafted. A parent can limit his/her children to change TV channels within certain values, while the parent (User A) can go to any channel desired via the assistant server 200.

This limited and context-based sharing has other applications also. For example, a city can allow an average citizen to operate doors or other systems in emergency situations where it is normally prohibited to them, and can only be operated by a specialist or normally-authorized personnel. Access can also be extended to specific groups of people. Based on these people being added to a specific user group, pregnant women (in a business, hospital, shopping mall or community) may be given access to certain services 300b which are inaccessible to others for the duration of their pregnancy. Users whose electric cars break down in a specific way may have access to loaner cars in unmanned car parks where any normal user does not. Access to the user's broken-down car may predicatively be granted to a repairman who heads out to the car. Here, the users A, via the mobile device 100, will extend specific permissions to the repairman's mobile device 100a.

Social, family and community connections will be inferable from sharing patterns as well. This too can be used to make predictive sharing happen. If all home devices are being shared by one user A with another user(s) B, it is likely that the next home device to be registered at user A's home will also be shared with the same other user(s) B. Such patterns will be saved in the storage 250 and will be inferred using analytic algorithms created within the assistant server platform 210 or obtained as patterns that can be imported into the assistant server platform 210 from other software programs running on other servers.

Note that users can quickly forget their usernames and passwords to various services where access via the assistant server 200 suffices. An owning user A of mobile device 100 can also designate another user B as having the power to share access with yet other users. This can be implemented, for example, among members of a single household. One user can purchase a TV and interface it with the assistant server 200, and then provide access rights to other family members (users B), who can then each extend access to this TV (device 300a) as-needed to their respective guests.

The assistant server 200 can also transfer ownership of services from one user A to another. This allows, for example, user A to sell their house to another person and transfer all devices 300a within the house to that person. Similarly, a person (user A) changing offices can transfer ownership of all devices 300a and services 300b from themselves to another user B, where user A can then take ownership of other devices 300a and services 300b associated with a new office in which user A moves into. As pointed out above, services can be granted based on certain conditions also. For example, if a person unfortunately decreases, then their devices 300a and services 300b can automatically be turned over to their relevant family members or other desired people.

As pointed out above, gestures are a form of commands used with the virtual assistant system 10. Gestures are an easy way to operate the authority sharing features described above. The use of gestures—including eye movement or non-movement, eye brow movement, a gaze and a facial expression and all other visually-detected body movements (or non-movement) to extend or revoke authority of usage to users or groups of users—can be quite powerful, and can be performed using the virtual assistant system 10 as described herein.

Figure 12:
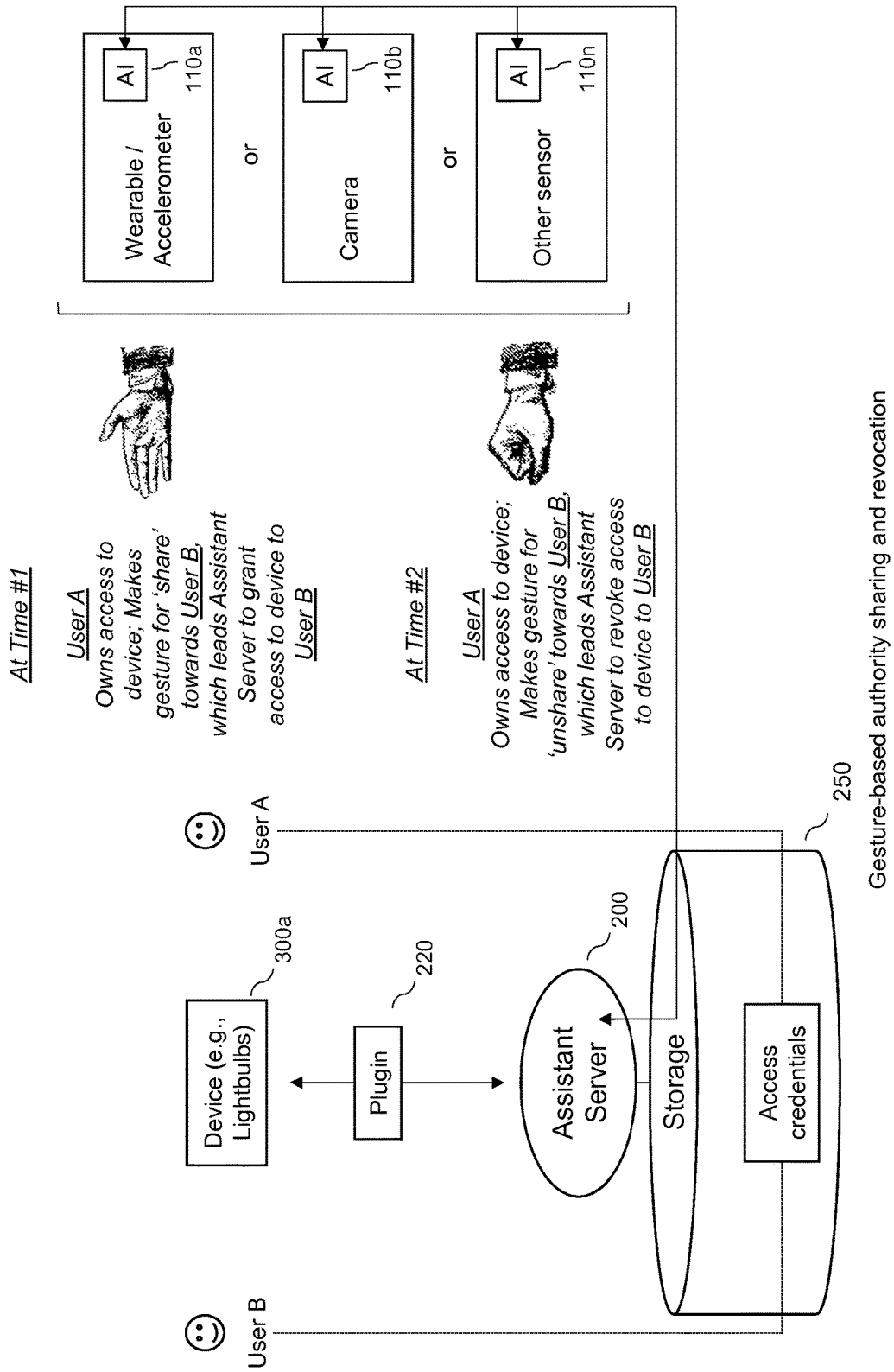
FIG. 12 is a diagram illustrating authority sharing and revocation of the virtual assistant system, according to an exemplary embodiment of the present general inventive concept.

Referring to FIG. 12, sharing access to control of a set of lights (external device 300a) to a user B could be as simple as the owner user A pointing to the lights and then making a gesture representing sharing (see Time #1) this access with the other user B. As a result, the assistant server 200 can grant access to user B. More specifically, in such an environment where a user A regularly works or lives, for example, a set of sensors, such as a camera or other type of photo-detecting device that are capable of capturing information about a user's movements, can be set up within the controlled environment. These sensors can be configured to have their own form of an assistant interface 110a-n such that when these sensors (see FIG. 12) detect a gesture by user A to share access to control devices 300a such as light bulbs, etc., within the controlled environment, this gesture command can be translated at the relevant sensor into the semantic information interchange format language and provided directly to the assistant server 200. As a result, the assistant server 200 can share access with a user B as instructed by the user A via a gesture command input representing sharing access.

For higher security situations, a camera or other type image sensor or other type sensor may be able to detect the actual hand or fingerprints of the user A in order to determine that it is in fact user A that is instructing the assistant server 200 to share access to another user B. Alternatively, the user A may have a wearable type device or accelerometer that detects a gesture made by user A. Moreover, when the sensor detects user B via the camera or other type recognition device, the assistant server 200 can store any predetermined detected character trait of user B and store this information within the storage 250 so that shared access may be provided to user B during later visits to such an environment.

Still referring to FIG. 12, revoking control to a user B can be as simple as making a gesture for "unshare" towards user B (see Time #2), which leads the assistant server 200 to revoke access to the device to user B. Alternatively, revoking can be performed by other gestures, such as, for example, making the same set of gestures as those of sharing access to user B, and then making a chopping gesture. This is merely an example to illustrate the various types of gestures that can be programmed into or learned by the assistant server 200. These gestures by user A can also be captured by a camera or other photo-detecting or sensing device that is capable of capturing information about movements of user A, which is in turn connected to the user's mobile device 100. Such gestures may also be captured by wearable, held or other devices that detect movement by using accelerometer hardware or other movement-tracking hardware, or even eye-tracking, lip-tracking or facial-tracking systems.

Alternatively, as described previously, user A may request a recent list of users B in which access has been shared. Once this list is provided to user A at the user interface 150 of mobile device 100 by the assistant server 200, user A may choose any user(s) B on the list provided at the user interface 150 and instruct the assistant server 200 through the user interface 150 to revoke future access.

It is also possible to set-up rules where access is extended temporarily to another user B and then must be extended periodically (or upon the occurrence of an event, such as someone departing from a geo-fenced area) with the use of a gesture. In this type of access sharing, if the owning user A makes such a gesture then access can be continued. If the owning user A fails to make the gesture, then access lapses.

Gestures may also be involuntary or be made in a way of which a user B is unaware. For example, a commercial establishment where products are sold may make door locks to certain restrooms operate for customers or prospective customers (i.e., user(s) B) who spend specific amounts of time in certain areas of the establishment, but not to others. Such a commercial establishment may even allow goods contained in secured closets or display cases to become accessible to certain customers based on gestures and movement information, which are not available to others, by granting them access to open the securing enclosures where others are not granted such access.

In geo-fencing and other such applications, locations can be determined by means of a GPS unit, WiFi unit, Bluetooth facility, location-broadcasting buoys, IP addresses, NFC, etc., which are connected to or in communication with the assistant server 200. Proximity-detection to location measuring sensing devices which may be embedded in automobiles, household objects, office objects and other objects can also measure location. Time can also be an element of the access determining means which can be setup and measured by a similar such computing device. The determining means of access can also include the sequence of user usages of the assistant server 200.

The virtual assistant system 10 described herein also provides the ability for users to have secret gestures for revoking and granting access to control external devices 300a and services 300b. For example, in a home break-in situation, a parent User A may grant the right to a child to summon the police using the home alarm via a secret gesture (where the child may not normally have this right).

These gestures may also operate in conjunction with icon-touches and voiced commands. The user A, for instance, might make a gesture that means 'share', then user A may recite the names of all the services he/she intends to share. A voice sensing device can detect the named services and accordingly provide access for these services. Then user A can point at the receiving user B as described above.

These gestures may also be used in situations where a subset of users from a large subset of users have to be granted or ungranted access to a service (or set of services). An example of such a situation is where a decision needs to be made as to who has access to a given cash register in a store from among a hundred sales associates. In such a situation, simply laying out a list of names or photos of the associates and pointing at the particular ones to whom access should be granted can be one mechanism for granting a subset of users particular access. Another mechanism can be through gaze-tracking where the user A looks at the particular ones who should be granted provisional access longer than the amount of time user A looks at the ones who should not be granted access. Such gestures can be conscious or unconscious on the part of user A.

Similarly, a situation can occur in the reverse where there are a large set of services and a decision needs to be rapidly made as to which services access should be provided (or access revoked from) for a user or a set of users. Gestures by the user A—conscious or unconscious—can be used in this situation as well.

Gestures may also be used to seek access to services 300b or devices 300a by users seeking shared access (i.e., a user B seeking access in which the user A with access rights). This enables a "silent" conversation where one user seeks access to a given service 300b or device 300a with one set of gestures and is granted such access—either by an owner user A with another set of gestures or through some decision made programmatically (algorithmically) by the assistant server 200 and sensor device combination which is observing the gestured request. These algorithms that determine such shared access can be software programs or parts of software programs running as part of the assistant server 200 together with other programs running within the assistant server platform 210.

Figure 13:
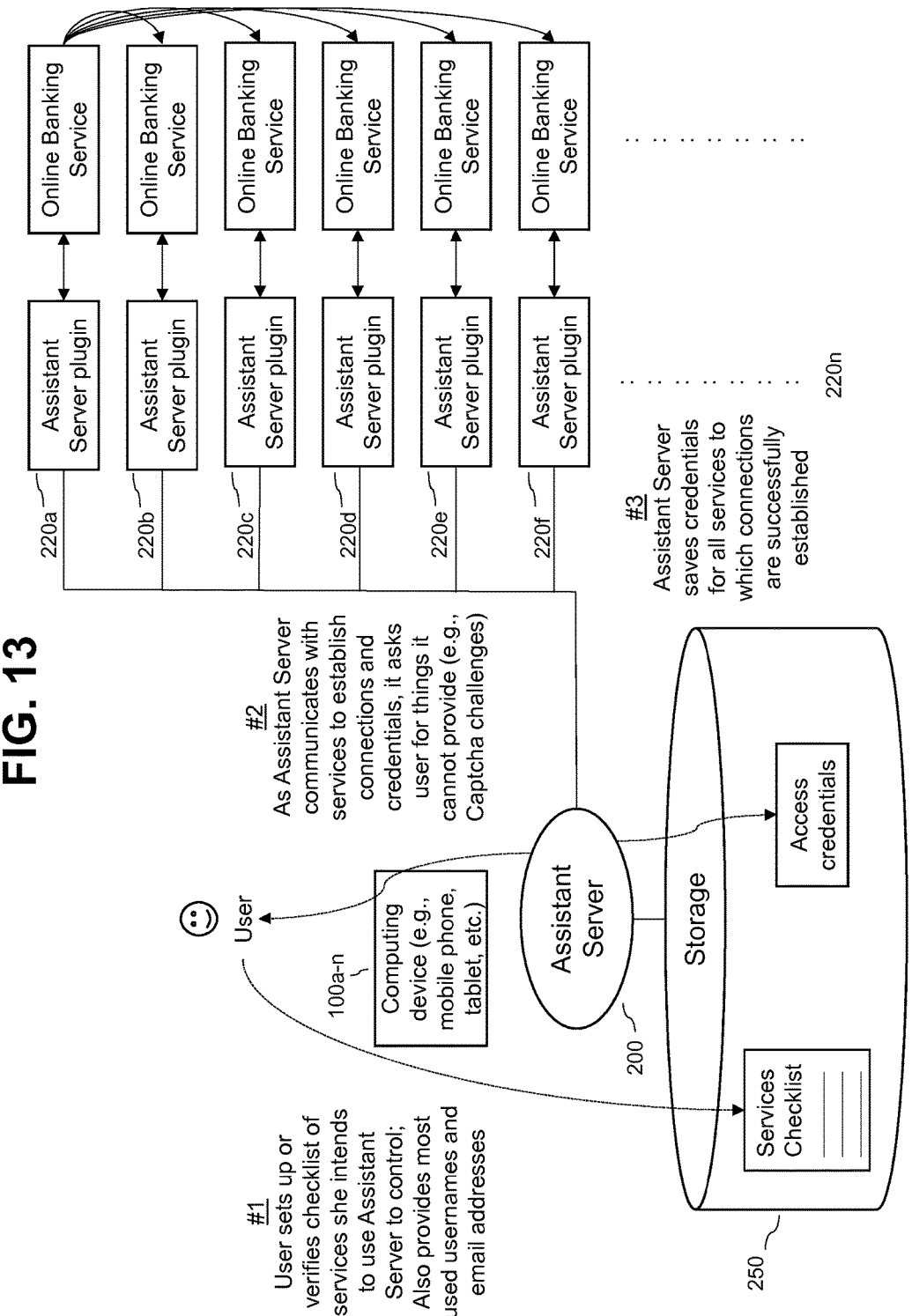
FIG. 13 is a diagram illustrating mass-addition of services to the virtual assistant system, according to an exemplary embodiment of the present general inventive concept.

Referring to FIG. 13, a user of the mobile device 100 can add, including a mass-addition, services to an assistant server 200 based on a questionnaire, survey or form-filling of credentials and other service-related data, as well as based on discovery.

More specifically, it is likely that when the assistant server 200 becomes established other users will want to provide all their individual account credentials to the assistant server 200 so the other users can rapidly establish connections to those services 300b. For example, a user can give his/her usernames and passwords to LinkedIn™, Yahoo™, Google™, Amazon™, Facebook™, etc., to the assistant server 200 at one sitting, which enables the assistant server 200 to systematically connect to these services 300b all quickly. This can be done by filling in a form that the assistant server 200 provides to the users. This form can be a spreadsheet, email form, fillable PDF, web-based form, a voice-based question and response session, or any other data collecting mechanism through which this type of information can be collected. The form can be delivered to the user via the Internet or via some other connection mechanism such as Bluetooth or NFC, or even physical mail or courier service.

The assistant server 200 can also take the user through a process where the user is asked for credentials to most common services 300b that the user is likely to be using—which is similar to filling out a survey. The assistant server 200 can do something similar for devices 300a. For example, the assistant server 200 can detect devices 300a on the user's home network and then connect to them automatically by requesting the corresponding credentials when necessary. Information relating to these credentials and devices 300a can be saved on a storage 250 that is connected to the assistant server 200.

Similarly, the assistant server 200 can actually take the user's emails and then probe most common services 300b1-n with those emails to see if they already have associated accounts. In this case, the user can provide various email addresses to the assistant server 200, which can save these email addresses and then use them to attempt to log into various web services and other services. If these users have forgotten their passwords, the assistant server 200 can initiate a password reset process (i.e., either by conducting the password reset process automatically or with the user's help if services like Recaptcha™ are involved, which require humans to recognize obfuscated letters and numbers) and revive those accounts and link them to the user's accounts. This also means that users may no longer have to come up with passwords. The assistant server 200 can come up with highly complex passwords which the user does not need to remember since the users are almost always going to access the underlying services through the assistant server 200. These highly complex passwords are then saved on the storage 250.

The assistant server 200 can also take a user through a process of establishing brand new accounts with various services 300b1-n that are relevant to people similar to the user. This can have many applications. For example, the assistant server 200 can be used to establish a voting account in an election system for a citizen when they achieve a certain age. It can be used to enable the citizen to establish an account with bmw.com when they buy a BMW. The rules determining such new service setups can either be saved on the storage 250 or be communicated to the assistant server 200 by other services 300b1-n that are able to communicate with the assistant server 200 over the Internet, WiFi, Bluetooth, NFC, USB or other mechanisms.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a blue-ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus comprising:
a communicator;
a central processing unit (CPU);
a sensor configured to receive a first input command to perform a first function at a first external service; and
a storage unit storing instructions executable by the CPU, the instructions configured to implement:
an assistant interface configured to:
digitally translate the first input command into a semantic information interchange language format using the CPU;
send the translated first input command to an external server via the communicator to perform the first function at the first external service; and
receive from the external server via the communicator a first external data set from the first external service, the first external data set formatted according to the semantic information interchange language format;
the sensor further configured to receive a second input command to perform a second function utilizing the first external data set at a second external service;
the assistant interface further configured to:
digitally translate the second input command into the semantic information interchange language format using the CPU; and
send the translated second input command and the external data set to the external server using the communicator to perform the second function at the second external service.

2. The apparatus of claim 1, the first external service comprising a first social network, the first function comprising retrieving first user profile data from the first social network, the first external data set comprising the retrieved first user profile data, the second external service comprising a second social network, the second function comprising retrieving from the second social network user profile data corresponding to the first user profile data.

3. The apparatus of claim 1, the first external service comprising a controllable hardware instance, the first function comprising retrieving identifying information of the controllable hardware instance, the first external data set comprising the retrieved identifying information, the second external service comprising an online shopping application, the second function comprising submitting to the online shopping application a request to purchase the controllable hardware instance based on the retrieved identifying information.

4. The apparatus of claim 1, the first external service comprising a voice assistant integrated with the apparatus, the first function comprising retrieving data identifying the second external service from a voice input to the voice assistant, the first external data set comprising data identifying the second external service, the assistant interface further configured to send the translated second input command and the external data set to the external server to perform the second function at the second external service identified by the first external data set.

5. The apparatus of claim 4, the voice input to the voice assistant comprising a user-input request to make a dining reservation using an online reservation application, the first external data set identifying the online reservation application as the second external service.

6. The apparatus of claim 1, the first external data set comprising the first input command translated into a first custom protocol used by the first external service, the assistant interface further configured to:

translate the first external data set from the semantic information interchange language format into the first custom protocol to generate a first custom version of the first input command;

the apparatus configured to directly transmit the first custom version of the first input command to the first external service using a wireless connection.

7. The apparatus of claim 6, the first external service comprising a controllable light emitting diode (LED) light bulb, the first custom version of the first input command comprising a command string formatted according to the first custom protocol to reduce the brightness of the LED light bulb, the apparatus configured to directly transmit the command string to the LED light bulb.

8. The apparatus of claim 6, the wireless connection corresponding to a Wi-Fi, Wi-Fi direct, Near-field communication, Bluetooth, or RFID connection.

9. The apparatus of claim 1, the sensor corresponding to a touch screen, pressure sensor, motion sensor, heat sensor, proximity sensor, gyration sensor, or global positioning service sensor.

10. The apparatus of claim 1, further comprising a global positioning system (GPS) sensor generating a sensed position of the apparatus, the assistant interface configured to send the translated first input command to the external server along with the sensed position of the apparatus, at least one of the first external service and the first function at the first external service being defined differently based on the sensed position of the apparatus.

11. The apparatus of claim 10, the first input command comprising a first hand sign, the first function of the first external service corresponding to opening a garage door when the sensed position of the apparatus corresponds to a position outside of a user's house, and the first function of the first external service corresponding to closing the garage door when the sensed position of the apparatus corresponds to position inside the user's house.

12. A method comprising:
receiving a first input command using a sensor to perform a first function at a first external service;
using instructions stored on a storage unit coupled to a central processing unit (CPU), configuring the CPU to execute the steps of:
digitally translating the first input command using an assistant interface into a semantic information interchange language format using the CPU;
sending the translated first input command using the assistant interface to an external server via a communicator to perform the first function at the first external service;
receiving from the external server via the communicator a first external data set from the first external service, the first external data set formatted according to the semantic information interchange language format;
receiving a second input command using the sensor to perform a second function utilizing the first external data set at a second external service;
digitally translating the second input command using the assistant interface into the semantic information interchange language format using the CPU; and sending the translated second input command and the external data set to the external server using the communicator to perform the second function at the second external service.

13. The method of claim 12, the first external service comprising a first social network, the first function comprising retrieving first user profile data from the first social network, the first external data set comprising the retrieved first user profile data, the second external service comprising a second social network, the second function comprising retrieving from the second social network user profile data corresponding to the first user profile data.

14. The method of claim 12, the first external service comprising a controllable hardware instance, the first function comprising retrieving identifying information of the controllable hardware instance, the first external data set comprising the retrieved identifying information, the second external service comprising an online shopping application, the second function comprising submitting to the online shopping application a request to purchase the controllable hardware instance based on the retrieved identifying information.

15. The method of claim 12, the first external service comprising a voice assistant integrated with the apparatus, the first function comprising retrieving data identifying the second external service from a voice input to the voice assistant, the first external data set comprising data identifying the second external service, the assistant interface further configured to send the translated second input command and the external data set to the external server to perform the second function at the second external service identified by the first external data set.

16. The method of claim 15, the voice input to the voice assistant comprising a user-input request to make a dining reservation using an online reservation application, the first external data set identifying the online reservation application as the second external service.

17. The method of claim 12, the first external data set comprising the first input command translated into a first custom protocol used by the first external service, the method further comprising:
translating the first external data set using the assistant interface from the semantic information interchange language format into the first custom protocol to generate a first custom version of the first input command;
directly transmitting the first custom version of the first input command to the first external service using a wireless connection.

18. The method of claim 17, the first external service comprising a controllable light emitting diode (LED) light bulb, the first custom version of the first input command comprising a command string formatted according to the first custom protocol to reduce the brightness of the LED light bulb, the apparatus configured to directly transmit the command string to the LED light bulb.

19. The method of claim 17, the wireless connection corresponding to a Wi-Fi, Wi-Fi direct, Near-field communication, Bluetooth, or RFID connection.

* * * * *